(12) United States Patent
Matsumoto

(10) Patent No.: US 11,720,218 B2
(45) Date of Patent: Aug. 8, 2023

(54) DATA PROCESSING DEVICE

(71) Applicant: Semiconductor Energy Laboratory Co., Ltd., Atsugi (JP)

(72) Inventor: Hiroshi Matsumoto, Aiko (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 17/569,640

(22) Filed: Jan. 6, 2022

(65) Prior Publication Data

US 2022/0129116 A1 Apr. 28, 2022

Related U.S. Application Data

(63) Continuation of application No. 16/572,908, filed on Sep. 17, 2019, now Pat. No. 11,221,720, which is a (Continued)

(30) Foreign Application Priority Data

Jul. 2, 2013 (JP) ................................. 2013-138895

(51) Int. Cl.
*G06F 1/16* (2006.01)
*G06F 3/044* (2006.01)
(Continued)

(52) U.S. Cl.
CPC .......... *G06F 3/0446* (2019.05); *G06F 1/1626* (2013.01); *G06F 1/1637* (2013.01);
(Continued)

(58) Field of Classification Search
CPC .... G06F 3/0446; G06F 3/0412; G06F 3/1431; G06F 3/1446; G06F 3/03; G06F 1/1626;
(Continued)

(56) References Cited

U.S. PATENT DOCUMENTS 6,788,292 B1 9/2004 Nako et al.
6,972,752 B2 12/2005 Nako et al.
(Continued)

FOREIGN PATENT DOCUMENTS

CN 001334690 A 2/2002
CN 101120295 A 2/2008
(Continued)

OTHER PUBLICATIONS

Chinese Office Action (Application No. 201910041998.2) dated Jul. 22, 2022.
(Continued)

*Primary Examiner* — Brent D Castiaux
(74) *Attorney, Agent, or Firm* — Robinson Intellectual Property Law Office; Eric J. Robinson

(57) ABSTRACT

To provide a highly browsable data processing device or a highly portable data processing device, a data processing device including the following is devised: an input/output unit provided with a display portion which can be folded and unfolded and a sensor portion that can sense the folded and unfolded states of the display portion and can supply data on fold, and an arithmetic unit that stores a program for executing different processing depending on the data on fold.

8 Claims, 10 Drawing Sheets

Related U.S. Application Data continuation of application No. 15/695,195, filed on Sep. 5, 2017, now Pat. No. 10,452,104, which is a continuation of application No. 14/311,842, filed on Jun. 23, 2014, now Pat. No. 9,753,495.

(51) Int. Cl.
    *G06F 3/041* (2006.01)
    *G06F 3/14* (2006.01)

(52) U.S. Cl.
    CPC .......... *G06F 1/1641* (2013.01); *G06F 1/1643* (2013.01); *G06F 1/1677* (2013.01); *G06F 3/0412* (2013.01); *G06F 3/1431* (2013.01); *G06F 3/1446* (2013.01); *G09G 2300/0426* (2013.01); *G09G 2330/04* (2013.01); *G09G 2340/0442* (2013.01); *G09G 2354/00* (2013.01); *G09G 2380/02* (2013.01)

(58) Field of Classification Search
    CPC .... G06F 1/1637; G06F 1/1641; G06F 1/1643; G06F 1/1677; G09G 2300/0426; G09G 2330/04; G09G 2340/0442; G09G 2354/00; G09G 2380/02
    See application file for complete search history.

(56) References Cited

U.S. PATENT DOCUMENTS

| | | | |
|---|---|---|---|
| 7,433,179 B2 | 10/2008 | Hisano et al. | |
| 7,714,801 B2 | 5/2010 | Kimmel | |
| 7,787,917 B2 | 8/2010 | Aoki et al. | |
| 8,170,631 B2 | 5/2012 | Aoki et al. | |
| 8,319,725 B2 | 11/2012 | Okamoto et al. | |
| 8,369,075 B2 | 2/2013 | Huang | |
| 8,504,936 B2 | 8/2013 | Gimpl et al. | |
| 8,543,166 B2 | 9/2013 | Choi et al. | |
| 8,547,197 B2 | 10/2013 | Byun et al. | |
| 8,803,816 B2 | 8/2014 | Kilpatrick, II et al. | |
| 8,825,121 B2 | 9/2014 | Aoki et al. | |
| 8,836,611 B2 | 9/2014 | Kilpatrick, II et al. | |
| 8,860,632 B2 | 10/2014 | Kilpatrick, II et al. | |
| 8,860,765 B2 | 10/2014 | Kilpatrick, II et al. | |
| 8,863,038 B2 | 10/2014 | King et al. | |
| 8,866,840 B2 | 10/2014 | Dahl et al. | |
| 8,872,731 B2 | 10/2014 | Gimpl et al. | |
| 8,873,225 B2 | 10/2014 | Huitema et al. | |
| 8,899,791 B2 | 12/2014 | Liu | |
| 8,911,653 B2 | 12/2014 | Yamazaki et al. | |
| 8,933,874 B2 | 1/2015 | Lundqvist et al. | |
| 8,947,320 B2 | 2/2015 | King et al. | |
| 9,000,442 B2 | 4/2015 | Hatano et al. | |
| 9,009,984 B2 | 4/2015 | Caskey et al. | |
| 9,235,238 B2 | 1/2016 | Ishizuka | |
| 10,804,489 B2 | 10/2020 | Yamazaki et al. | |
| 10,910,597 B2 | 2/2021 | Yamazaki et al. | |
| 11,005,071 B2 | 5/2021 | Yamazaki et al. | |
| 2002/0005818 A1 | 1/2002 | Bruzzone | |
| 2006/0034042 A1 | 2/2006 | Hisano et al. | |
| 2007/0085845 A1 | 4/2007 | Kikuchi et al. | |
| 2007/0097014 A1 | 5/2007 | Solomon et al. | |
| 2007/0226384 A1 | 9/2007 | Robbin et al. | |
| 2010/0056223 A1 | 3/2010 | Choi et al. | |
| 2010/0060664 A1 | 3/2010 | Kilpatrick, II et al. | |
| 2010/0064244 A1 | 3/2010 | Kilpatrick, II et al. | |
| 2010/0064536 A1 | 3/2010 | Caskey et al. | |
| 2010/0066643 A1 | 3/2010 | King et al. | |
| 2010/0079355 A1 | 4/2010 | Kilpatrick, II et al. | |
| 2010/0085274 A1 | 4/2010 | Kilpatrick, II et al. | |
| 2010/0085382 A1 | 4/2010 | Lundqvist et al. | |
| 2010/0121741 A1 | 5/2010 | Hotelling et al. | |
| 2010/0131567 A1 | 5/2010 | Dorogusker et al. | |
| 2010/0169509 A1 | 7/2010 | Marriott | |
| 2011/0069094 A1* | 3/2011 | Knapp ................ G09G 3/3426 345/82 |
| 2011/0111798 A1 | 5/2011 | Jeon et al. | |
| 2011/0126141 A1 | 5/2011 | King et al. | |
| 2011/0216064 A1 | 9/2011 | Dahl et al. | |
| 2012/0033354 A1 | 2/2012 | Huang | |
| 2012/0084791 A1 | 4/2012 | Benedek et al. | |
| 2012/0162049 A1 | 6/2012 | Aoki et al. | |
| 2012/0206386 A1 | 8/2012 | Xu et al. | |
| 2012/0217516 A1 | 8/2012 | Hatano et al. | |
| 2012/0235894 A1 | 9/2012 | Phillips | |
| 2012/0259876 A1 | 10/2012 | Mathai et al. | |
| 2012/0262367 A1 | 10/2012 | Chiu et al. | |
| 2012/0276958 A1* | 11/2012 | Inami ................ H04M 1/0241 455/566 |
| 2012/0306910 A1 | 12/2012 | Kim et al. | |
| 2012/0307423 A1 | 12/2012 | Bohn et al. | |
| 2012/0329528 A1 | 12/2012 | Song | |
| 2013/0009909 A1 | 1/2013 | Yamazaki et al. | |
| 2013/0010405 A1* | 1/2013 | Rothkopf ............ H05K 5/0226 361/679.01 |
| 2013/0019183 A1 | 1/2013 | Reeves et al. | |
| 2013/0080143 A1 | 3/2013 | Reeves et al. | |
| 2013/0080909 A1 | 3/2013 | Reeves et al. | |
| 2013/0080940 A1 | 3/2013 | Reeves et al. | |
| 2013/0154298 A1 | 6/2013 | Ricci | |
| 2013/0167159 A1 | 6/2013 | Ricci et al. | |
| 2013/0173035 A1 | 7/2013 | Fadell et al. | |
| 2013/0208417 A1 | 8/2013 | Sirpal | |
| 2014/0164240 A1 | 6/2014 | Gautier et al. | |
| 2014/0227963 A1 | 8/2014 | Ng et al. | |
| 2014/0361980 A1 | 12/2014 | Iwaki et al. | |
| 2014/0380203 A1 | 12/2014 | Freedman | |
| 2015/0006035 A1 | 1/2015 | Ricci | |
| 2015/0012821 A1 | 1/2015 | Mirrashidi et al. | |
| 2015/0015613 A1 | 1/2015 | Iwaki | |
| 2015/0016126 A1 | 1/2015 | Hirakata et al. | |
| 2015/0022515 A1 | 1/2015 | Ikeda et al. | |
| 2015/0022561 A1 | 1/2015 | Ikeda et al. | |
| 2015/0046858 A1 | 2/2015 | Gimpl et al. | |
| 2015/0058611 A1 | 2/2015 | Reeves et al. | |
| 2015/0169617 A1 | 6/2015 | Fadell | |
| 2015/0234482 A1 | 8/2015 | Jobs et al. | |
| 2015/0234544 A1 | 8/2015 | Sirpal et al. | |
| 2015/0242070 A1 | 8/2015 | Sirpal et al. | |
| 2015/0254805 A1 | 9/2015 | Sirpal et al. | |
| 2015/0262152 A1 | 9/2015 | Muller et al. | |
| 2015/0268851 A1 | 9/2015 | Sirpal | |
| 2016/0034175 A1 | 2/2016 | Cassar et al. | |
| 2016/0034176 A1 | 2/2016 | Sirpal | |
| 2016/0041696 A1 | 2/2016 | Sirpal et al. | |
| 2016/0041697 A1 | 2/2016 | Sirpal et al. | |
| 2016/0041704 A1 | 2/2016 | Reeves et al. | |
| 2016/0041715 A1 | 2/2016 | Sirpal et al. | |
| 2016/0041756 A1 | 2/2016 | Sirpal et al. | |
| 2016/0041757 A1 | 2/2016 | Sirpal et al. | |
| 2016/0044152 A1 | 2/2016 | Sirpal et al. | |
| 2016/0048165 A1 | 2/2016 | Becze | |
| 2016/0048299 A1 | 2/2016 | Sirpal et al. | |
| 2016/0048301 A1 | 2/2016 | Sirpal et al. | |
| 2016/0054757 A1 | 2/2016 | Reeves et al. | |
| 2016/0054862 A1 | 2/2016 | Reeves et al. | |
| 2016/0054880 A1 | 2/2016 | Sirpal et al. | |
| 2016/0054902 A1 | 2/2016 | Sirpal et al. | |
| 2016/0054970 A1 | 2/2016 | Reeves et al. | |
| 2016/0062554 A1 | 3/2016 | Sirpal et al. | |
| 2016/0062583 A1 | 3/2016 | Ricci | |
| 2016/0062593 A1 | 3/2016 | Schrock | |
| 2016/0062631 A1 | 3/2016 | Webber | |
| 2016/0070456 A1 | 3/2016 | Ricci et al. | |
| 2016/0070527 A1 | 3/2016 | Ricci | |
| 2016/0082839 A1 | 3/2016 | Ricci | |
| 2016/0085384 A1 | 3/2016 | Selim | |
| 2016/0085406 A1 | 3/2016 | Sirpal et al. | |
| 2016/0086391 A1 | 3/2016 | Ricci | |
| 2016/0098064 A1 | 4/2016 | Becze et al. | |
| 2016/0098121 A1 | 4/2016 | Sirpal et al. | |
| 2016/0098417 A1 | 4/2016 | Reeves | |
| 2016/0103597 A1 | 4/2016 | Gimpl et al. | |
| 2016/0103603 A1 | 4/2016 | Sirpal et al. | |
| 2016/0110049 A1 | 4/2016 | Cassar et al. | |

(56) References Cited

U.S. PATENT DOCUMENTS

| | | |
|---|---|---|
| 2016/0110150 A1 | 4/2016 | Sirpal et al. |
| 2016/0114745 A1 | 4/2016 | Ricci |
| 2016/0127887 A1 | 5/2016 | Ricci |
| 2016/0140776 A1 | 5/2016 | Ricci |
| 2016/0149995 A1 | 5/2016 | Heller et al. |
| 2016/0163133 A1 | 6/2016 | Ricci |
| 2016/0170633 A1 | 6/2016 | Sirpal et al. |
| 2016/0179208 A1 | 6/2016 | Reeves et al. |
| 2016/0179350 A1 | 6/2016 | Reeves et al. |
| 2016/0179367 A1 | 6/2016 | Gimpl et al. |
| 2016/0185222 A1 | 6/2016 | Ricci et al. |
| 2016/0188190 A1 | 6/2016 | Ricci et al. |
| 2016/0188204 A1 | 6/2016 | Sirpal et al. |
| 2016/0189544 A1 | 6/2016 | Ricci |
| 2016/0196007 A1 | 7/2016 | Reeves et al. |
| 2016/0196059 A1 | 7/2016 | Sirpal et al. |
| 2016/0205419 A1 | 7/2016 | Ricci et al. |
| 2016/0255408 A1 | 9/2016 | Ricci |
| 2016/0255575 A1 | 9/2016 | Ricci |
| 2016/0266759 A1 | 9/2016 | Reeves |
| 2016/0274783 A1 | 9/2016 | Schrock et al. |
| 2016/0291920 A1 | 10/2016 | Sirpal et al. |
| 2016/0306615 A1 | 10/2016 | Ricci |
| 2016/0306766 A1 | 10/2016 | Ricci |
| 2016/0313730 A1 | 10/2016 | Ricci et al. |
| 2016/0313964 A1 | 10/2016 | De Paz et al. |
| 2016/0320921 A1 | 11/2016 | Sirpal |
| 2017/0038934 A1 | 2/2017 | Sirpal et al. |
| 2017/0039019 A1 | 2/2017 | De Paz |
| 2017/0052634 A1 | 2/2017 | Reeves |
| 2017/0066406 A1 | 3/2017 | Ricci |
| 2017/0067747 A1 | 3/2017 | Ricci |
| 2017/0068404 A1 | 3/2017 | Jobs et al. |
| 2017/0068438 A1 | 3/2017 | Ricci |
| 2017/0075701 A1 | 3/2017 | Ricci et al. |
| 2017/0078223 A1 | 3/2017 | Ricci et al. |
| 2017/0078472 A1 | 3/2017 | Ricci |
| 2017/0082447 A1 | 3/2017 | Ricci |
| 2017/0093643 A1 | 3/2017 | Ricci et al. |
| 2017/0097243 A1 | 4/2017 | Ricci |
| 2017/0099295 A1 | 4/2017 | Ricci |
| 2017/0108935 A1 | 4/2017 | Ricci |
| 2017/0131712 A1 | 5/2017 | Ricci et al. |
| 2017/0132917 A1 | 5/2017 | Ricci |
| 2017/0228208 A1 | 8/2017 | Sirpal et al. |
| 2017/0232888 A1 | 8/2017 | Ricci |
| 2017/0247000 A1 | 8/2017 | Ricci |
| 2017/0249095 A1 | 8/2017 | Ricci |
| 2017/0249474 A1 | 8/2017 | Ricci et al. |
| 2017/0357797 A1 | 12/2017 | Rubinstein et al. |
| 2018/0052854 A1 | 2/2018 | Cue et al. |
| 2018/0060012 A1 | 3/2018 | Jouin |
| 2018/0074776 A1 | 3/2018 | Sirpal et al. |
| 2019/0115564 A1 | 4/2019 | Yamazaki et al. |
| 2022/0181584 A1 | 6/2022 | Yamazaki et al. |

FOREIGN PATENT DOCUMENTS

| | | |
|---|---|---|
| CN | 102150095 A | 8/2011 |
| CN | 102150097 A | 8/2011 |
| CN | 102150126 A | 8/2011 |
| CN | 202058412 U | 11/2011 |
| CN | 102541177 A | 7/2012 |
| CN | 102723058 A | 10/2012 |
| CN | 102857592 A | 1/2013 |
| CN | 102999309 A | 3/2013 |
| CN | 103050064 A | 4/2013 |
| CN | 103149979 A | 6/2013 |
| EP | 1058181 A | 12/2000 |
| EP | 2456175 A | 5/2012 |
| EP | 2500898 A | 9/2012 |
| EP | 2521002 A | 11/2012 |
| EP | 2521003 A | 11/2012 |
| EP | 2530941 A | 12/2012 |
| EP | 2565751 A | 3/2013 |
| EP | 2755459 A | 7/2014 |
| EP | 3057385 A | 8/2016 |
| EP | 3190476 A | 7/2017 |
| EP | 3537274 A | 9/2019 |
| JP | 11-272656 A | 10/1999 |
| JP | 2005-115536 A | 4/2005 |
| JP | 2006-053678 A | 2/2006 |
| JP | 2006-243621 A | 9/2006 |
| JP | 2006-287982 A | 10/2006 |
| JP | 2008-294490 A | 12/2008 |
| JP | 2009-105817 A | 5/2009 |
| JP | 2009-164760 A | 7/2009 |
| JP | 2010-021740 A | 1/2010 |
| JP | 2010-140410 A | 6/2010 |
| JP | 2011-003537 A | 1/2011 |
| JP | 2011-518391 | 6/2011 |
| JP | 2011-209899 A | 10/2011 |
| JP | 2012-502321 | 1/2012 |
| JP | 2012-502368 | 1/2012 |
| JP | 2012-502372 | 1/2012 |
| JP | 2012-190794 A | 10/2012 |
| JP | 2012-198541 A | 10/2012 |
| JP | 2012-231330 A | 11/2012 |
| JP | 2013-025617 A | 2/2013 |
| JP | 2013-105312 A | 5/2013 |
| KR | 2011-0053269 A | 5/2011 |
| KR | 2011-0055718 A | 5/2011 |
| KR | 2011-0066165 A | 6/2011 |
| KR | 2011-0085904 A | 7/2011 |
| KR | 2013-0006295 A | 1/2013 |
| TW | 201024977 | 7/2010 |
| TW | M395340 | 12/2010 |
| TW | M430653 | 6/2012 |
| WO | WO-2006/072670 | 7/2006 |
| WO | WO-2008/083361 | 7/2008 |
| WO | WO-2009/131447 | 10/2009 |
| WO | WO-2010/028394 | 3/2010 |
| WO | WO-2010/028397 | 3/2010 |
| WO | WO-2010/028399 | 3/2010 |
| WO | WO-2010/028402 | 3/2010 |
| WO | WO-2010/028403 | 3/2010 |
| WO | WO-2010/028404 | 3/2010 |
| WO | WO-2010/028405 | 3/2010 |
| WO | WO-2010/028406 | 3/2010 |
| WO | WO-2010/028407 | 3/2010 |
| WO | WO-2012/044747 | 4/2012 |
| WO | WO-2014/175455 | 10/2014 |

OTHER PUBLICATIONS

International Search Report (Application No. PCT/JP2014/066751) dated Sep. 16, 2014.
Written Opinion (Application No. PCT/JP2014/066751) dated Sep. 16, 2014.
Chinese Office Action (Application No. 201480037540.5) dated Mar. 20, 2018.
Taiwanese Office Action (Application No. 103121720) dated Mar. 27, 2018.
Chinese Office Action (Application No. 201910041998.2) dated Nov. 17, 2021.

* cited by examiner

FIG. 1A
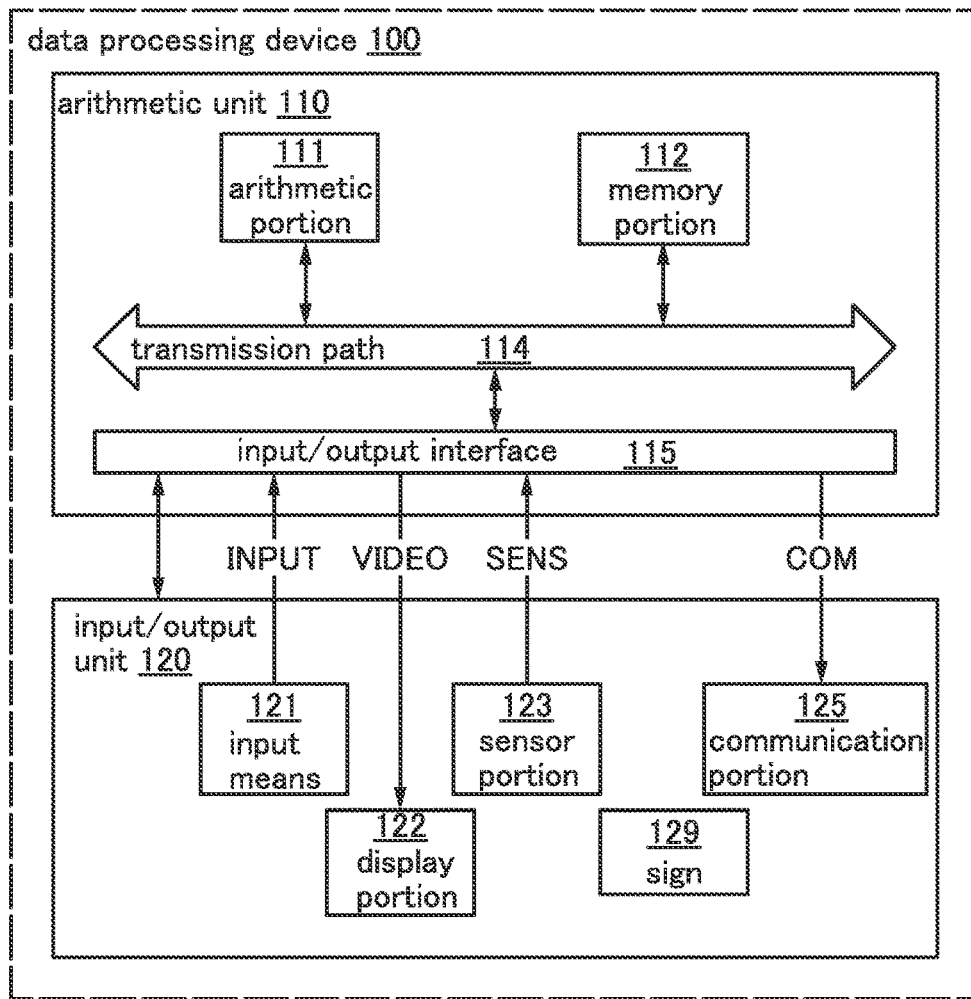
FIG. 1B1
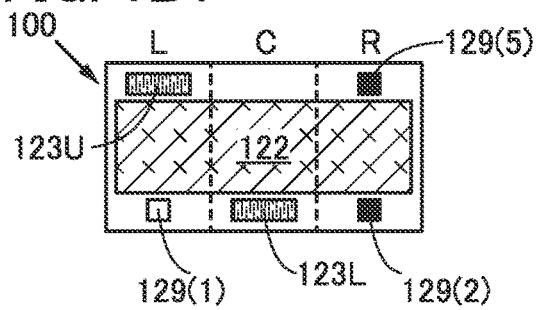
FIG. 1B2
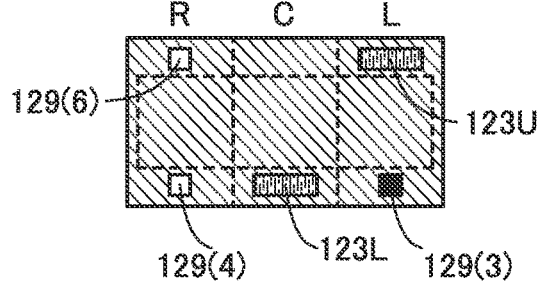
FIG. 1C1
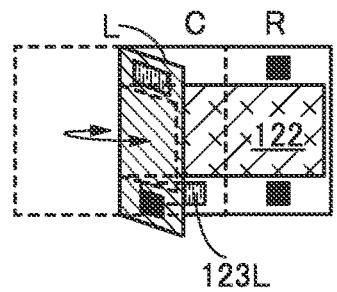
FIG. 1C2
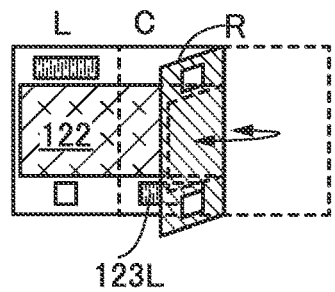

FIG. 3A1
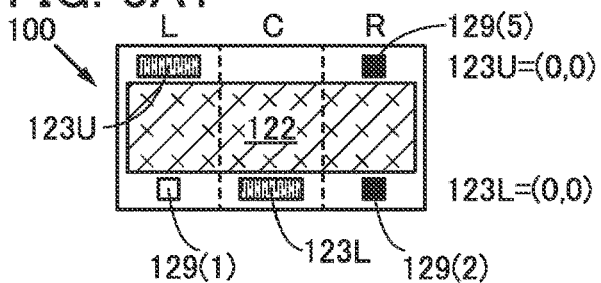
FIG. 3A2
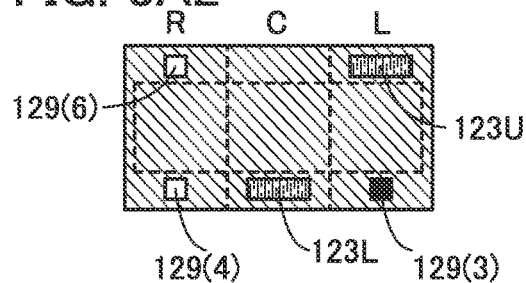
FIG. 3B1
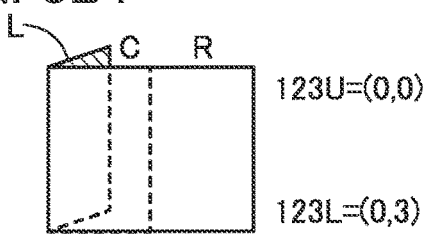
FIG. 3B2
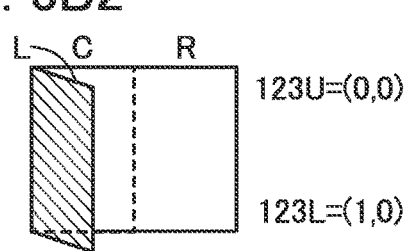
FIG. 3C1
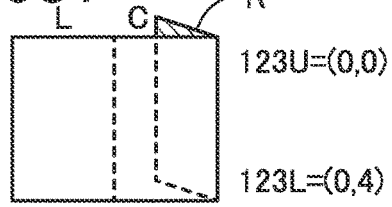
FIG. 3C2
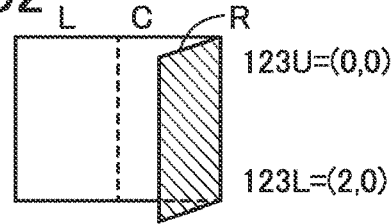
FIG. 3D1
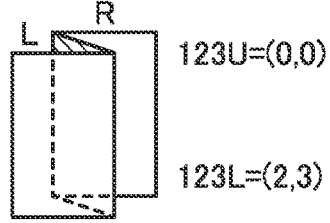
FIG. 3D2
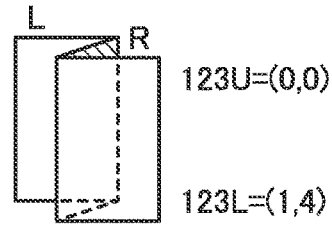
FIG. 3E1
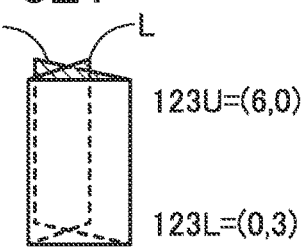
FIG. 3E2
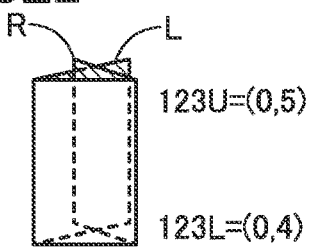
FIG. 3F1
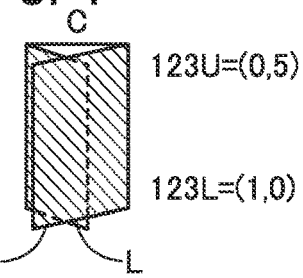
FIG. 3F2
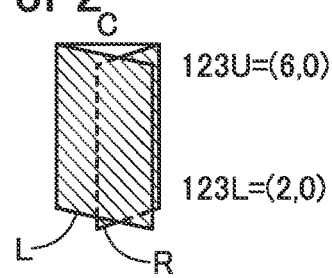

FIG. 7A1
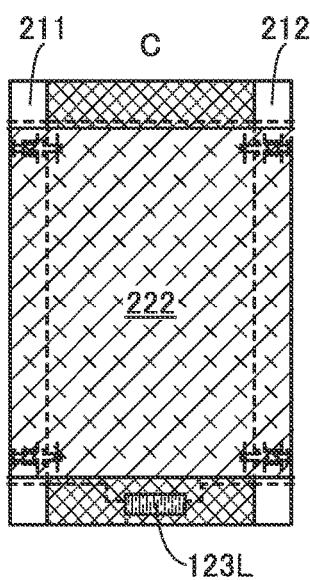
FIG. 7A2
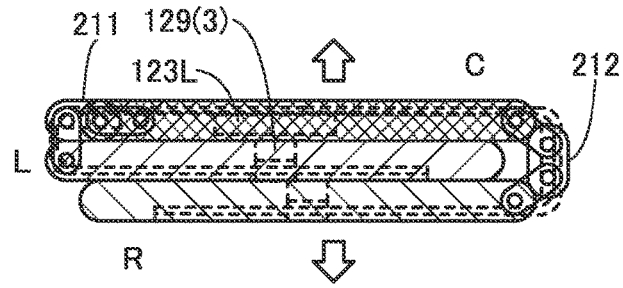
FIG. 7B1
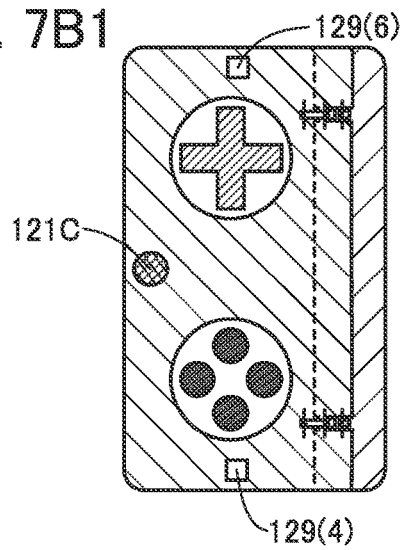
FIG. 7B2
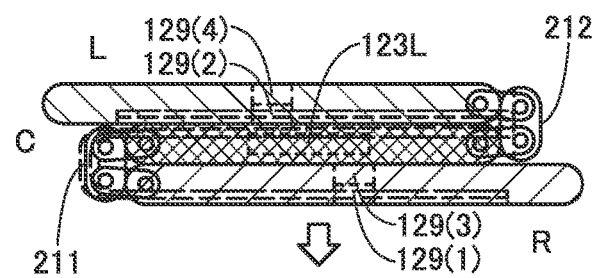
FIG. 7C1
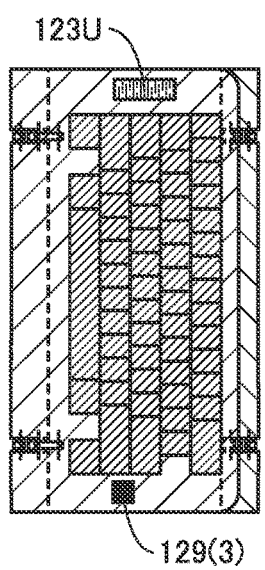
FIG. 7C2
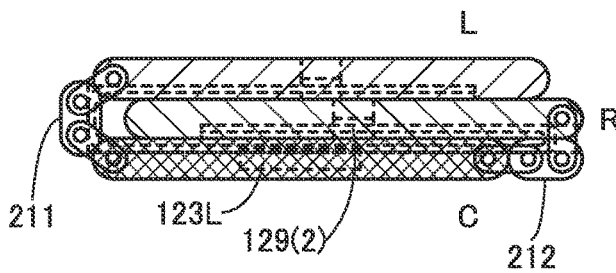

DATA PROCESSING DEVICE

TECHNICAL FIELD

The present invention relates to an object, a method, or a manufacturing method. In addition, the present invention relates to a process, a machine, manufacture, or a composition of matter. In particular, the present invention relates to, for example, a human interface, a semiconductor device, a display device, a light-emitting device, a power storage device, a driving method thereof, or a manufacturing method thereof. In particular, the present invention relates to, for example, a method and a program for processing and displaying image data, and a device including a recording medium in which the program is recorded. In particular, the present invention relates to, for example, a method for processing and displaying image data by which an image including data processed by a data processing device provided with a display portion is displayed, a program for displaying an image including data processed by a data processing device provided with a display portion, and a data processing device including a recording medium in which the program is recorded.

BACKGROUND ART

The social infrastructures relating to means for transmitting information have advanced. This has made it possible to acquire, process, and send out many pieces and a variety of information with the use of a data processing device not only at home or office but also at other visiting places.

With this being the situation, portable data processing devices are under active development.

For example, portable data processing devices are often used outdoors, and force might be accidentally applied by dropping to the data processing devices and display devices included in them. As an example of a display device that is not easily broken, a display device having high adhesiveness between a structure body by which a light-emitting layer is divided and a second electrode layer is known (Patent Document 1).

A multi-panel electronic device including the following functions is known. First acceleration data is received from a first sensor coupled to a first portion of an electronic device. In addition, second acceleration data is further received from a second sensor coupled to a second portion of the electronic device, and a position of the first portion is movable with respect to a position of the second portion. Moreover, a structure of the electronic device is further determined at least on the basis of part of the first acceleration data and part of the second acceleration data (Patent Document 2).

REFERENCE

Patent Document

[Patent Document 1] Japanese Published Patent Application No. 2012-190794
[Patent Document 2] Japanese Published Patent Application No. 2012-502372

DISCLOSURE OF INVENTION

Display devices with large screens on which much information can be displayed are excellent in browsability. Therefore, such display devices are suitable for data processing device.

On the other hand, the display devices with large screens deteriorate in portability compared to display devices with small screens.

One embodiment of the present invention is made in view of the foregoing technical background. Therefore, one object is to provide a highly browsable data processing device. Alternatively, another object is to provide a highly portable data processing device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a data processing device including an input/output unit which supplies data on whether the data processing device is fold (data on fold) and to which image data is supplied and an arithmetic unit to which the data on fold is supplied and which supplies the image data. The input/output unit includes a display portion which can be folded in two or more different states or unfolded and a sensor portion that can sense the state of the display portion and supply the data on fold. The arithmetic unit includes an arithmetic portion and a memory portion that stores a program for making the arithmetic portion execute processing. The program makes the arithmetic portion execute different processing depending on the data on fold.

The program that the data processing device of one embodiment of the present invention stores includes a first step of specifying a folded state on the basis of the data on fold; a second step of loading an application for processing allocated to the folded state; a third step of allowing interrupt processing; a fourth step of executing the interrupt processing and processing predetermined data; a fifth step of proceeding to a sixth step in the case where a termination instruction is supplied, whereas proceeding to the first step in the case where the termination instruction is not supplied; and the sixth step of terminating the program. The interrupt processing includes a seventh step of specifying the folded state on the basis of the data on fold; an eighth step of proceeding to a ninth step in the case where the folded state is changed, whereas proceeding to a tenth step in the case where the folded state is not changed; the ninth step of terminating the application; and the tenth step of recovering from the interrupt processing.

The data processing device of one embodiment of the present invention includes an input/output unit provided with a display portion which can be folded and unfolded and a sensor portion that can sense the folded and unfolded states of the display portion and can supply data on fold; and an arithmetic unit that stores a program for executing different processing depending on the data on fold. Accordingly, a highly browsable data processing device can be provided. Alternatively, a highly portable data processing device can be provided.

Another embodiment of the present invention is a data processing device including a connection housing provided with a first plane and a second plane opposite to the first plane; a sensor portion that discerns a first sign and a second sign which can approach the first plane of the connection housing, and a third sign and a fourth sign which can approach the second plane of the connection housing; a first housing connected to the connection housing so as to be movable from a position at which a first plane of the first housing faces the first plane of the connection housing to a position at which a second plane of the first housing opposite to the first plane thereof faces the second plane of the connection housing; and a second housing connected to the connection housing so as to be movable from a position at which a first plane of the second housing faces the first plane of the connection housing to a position at which a second plane of the second housing opposite to the first plane thereof faces the second plane of the connection housing. The connection housing, the first housing, and the second housing support a display portion having flexibility so that the display portion can be folded. The first housing is provided with the first sign on the first plane and the third sign on the second plane, and the second housing is provided with the second sign on the first plane and the fourth sign on the second plane.

In the data processing device of the another embodiment of the present invention, the second housing is provided with a fifth sign on the first plane and a sixth sign on the second plane, and the sensor portion discerns the sixth sign that approaches the first plane of the first housing and the fifth sign that approaches the second plane of the first housing.

The data processing device of the another embodiment of the present invention includes the display portion which can be folded and unfolded and the sensor portion that can sense the folded and unfolded states of the display portion and can supply data on fold. Accordingly, a highly browsable data processing device can be provided. Alternatively, a highly portable data processing device can be provided.

According to one embodiment of the present invention, a highly browsable data processing device can be provided. Alternatively, a highly portable data processing device can be provided.

BRIEF DESCRIPTION OF DRAWINGS

FIGS. 1A, 1B1, 1B2, 1C1, and 1C2 are a block diagram and schematic views illustrating a structure of a data processing device of one embodiment.

FIGS. 3A1, 3A2, 3B1, 3B2, 3C1, 3C2, 3D1, 3D2, 3E1, 3E2, 3F1, and 3F2 are schematic views illustrating two or more different states of a folded display portion of a data processing device of one embodiment.

FIGS. 7A1, 7A2, 7B1, 7B2, 7C1, and 7C2 illustrate a tri-fold data processing device of one embodiment.

BEST MODE FOR CARRYING OUT THE INVENTION

Figure 2A:
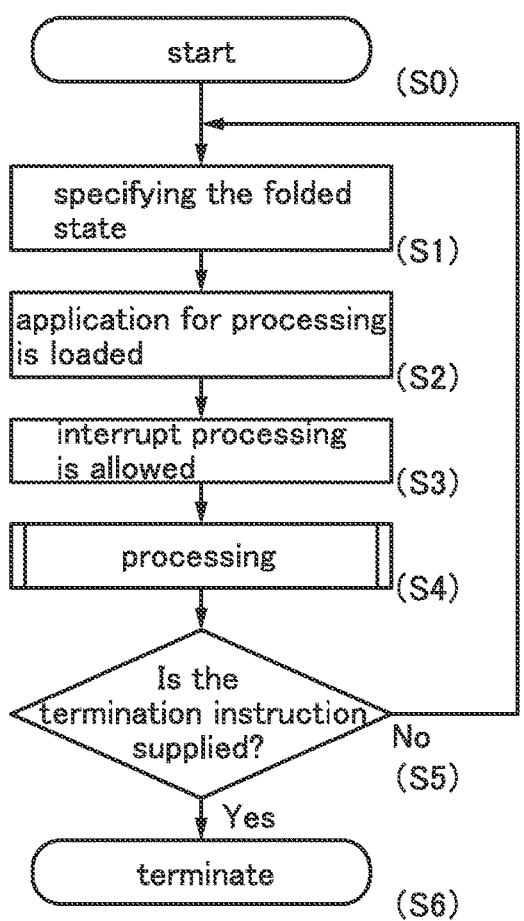
FIGS. 2A and 2B are flow charts showing a program to be executed by an arithmetic portion of the data processing device of one embodiment of the present invention.

Embodiments described below include one embodiment of the present invention which has been made focusing on an input/output unit provided with a display portion which can be folded in two or more different states and a sensor portion that senses the folded states of the display portion.

A data processing device of one embodiment of the present invention includes an input/output unit provided with a display portion which can be folded and unfolded and a sensor portion that can sense the folded and unfolded states of the display portion and can supply data on fold; and an arithmetic unit that stores a program for executing different processing depending on the data on fold.

According to the data processing device of one embodiment of the present invention, the arithmetic unit can execute different processing depending on the folded state of the data processing device. Accordingly, highly browsable data processing device can be provided. Alternatively, highly portable data processing device can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 11

In this embodiment, a structure of a data processing device of one embodiment of the present invention will be described with reference to FIGS. 1A, 1B1, 1B2, 1C1, and 1C2 and FIGS. 2A and 2B.

FIG. 1A shows a block diagram of a structure of a data processing device 100 of one embodiment of the present invention.

FIGS. 1B1 and 1B2 are schematic views illustrating a structure of the data processing device 100 of one embodiment of the present invention.

FIGS. 1C1 and 1C2 are schematic views illustrating operation of folding the data processing device 100 of one embodiment of the present invention.

Figure 2B:
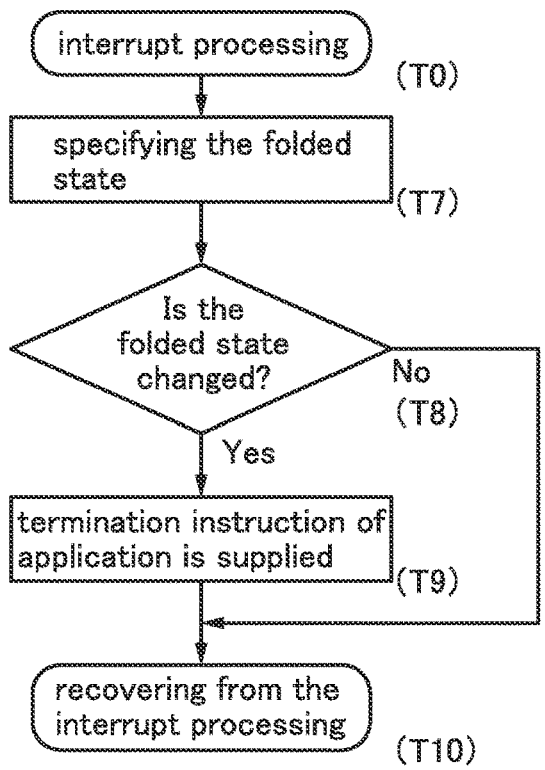

FIGS. 2A and 2B are flow charts showing a program to be executed by an arithmetic portion of the data processing device 100 of one embodiment of the present invention. FIG. 2A is a flow chart illustrating main processing, and FIG. 2B is a flow chart illustrating interrupt processing.

The data processing device 100 described in this embodiment includes an input/output unit 120 which supplies data SENS on fold and to which image data VIDEO is supplied and an arithmetic unit 110 to which the data SENS on fold is supplied and supplies the image data VIDEO (see FIG. 1A).

The input/output unit 120 includes a display portion 122 which can be folded in two or more different states or unfolded and a sensor portion 123 that can sense the state of the display portion 122 and supply the data SENS on fold.

The arithmetic unit 110 includes an arithmetic portion 111 and a memory portion 112 that stores a program for making the arithmetic portion 111 execute processing, and the program makes the arithmetic portion 111 execute different processing depending on the data SENS on fold.

The data processing device 100 described in this embodiment includes the input/output unit 120 provided with the display portion 122 which can be folded and unfolded and the sensor portion 123 that can sense the folded and unfolded states of the display portion 122 and can supply the data SENS on fold; and the arithmetic unit 110 that stores a program for executing different processing depending on the data SENS on fold. Accordingly, the display portion 122 can be unfolded and used. As a result, highly browsable data processing device can be provided. Alternatively, the display portion 122 can be folded. Thus, highly portable data processing device can be provided.

The arithmetic unit 110 described as an example in this embodiment includes an input/output interface 115 and a transmission path 114 (see FIG. 1A).

The input/output interface 115 can supply data to the input/output unit 120 and receive data supplied from the input/output unit 120.

The transmission path 114 can supply data to the arithmetic portion 111, the memory portion 112, and the input/output interface 115. In addition, the arithmetic portion 111, the memory portion 112, and the input/output interface 115 can supply data to the transmission path 114.

The input/output unit 120 includes an input means 121, a sign 129, a communication portion 125, and the like.

The input means 121 can supply an operation instruction INPUT including a termination instruction or the like. Note that the termination instruction is an instruction to terminate the program.

The sign 129 is placed near the display portion 122 and sensed by the sensor portion 123. Accordingly, the folded state of the display portion can be sensed.

Note that these portions cannot be clearly distinguished and one portion also serves as another portion or include part of another portion in some cases. For example, a touch panel in which a display portion overlaps with a touch sensor serves as the input means 121 as well as the display portion 122.

The data processing device 100 described as an example in this embodiment includes the memory portion 112 that stores the program including the following steps (see FIGS. 2A and 2B).

<<Program>>

In a first step, the folded state of the display portion 122 is specified by the data SENS on fold (see FIG. 2A (S1)).

A method of specifying the folded state of display portion 122 by the data SENS on fold will be described in detail in Embodiment 2.

In a second step, an application for processing allocated to the folded state is loaded (see FIG. 2A (S2)).

Note that as the application for processing allocated to the folded state, applications for viewing an electronic book, reproducing music, broadcasting, or viewing a moving image and for a game, a camera, or the like with the data processing device can be given.

In a third step, interrupt processing is allowed (see FIG. 2A (S3)).

In a fourth step, the interrupt processing is executed and predetermined data is processed (see FIG. 2A (S4)).

Note that as the data processing in the fourth step, processing for outputting the data in the memory portion 112 to the input/output unit 120 can be given. Specifically, the following processing can be given as examples: processing for enlarging image data which is compressed and stored in the memory portion 112 and displaying the image data on the display portion 122; processing for enlarging compressed and stored audio data and outputting the data to a speaker or the like; and processing for adjusting and displaying text data on the basis of layout data.

In the case where a termination instruction is supplied in a fifth step, the fifth step proceeds to a sixth step, whereas in the case where the termination instruction is not supplied, the fifth step proceeds to the first step (see FIG. 2A (S5)).

In the sixth step, the program is terminated (see FIG. 2A (S6)).

Next, the interrupt processing is described (see FIG. 2B). Note that when the interrupt processing is allowed, the arithmetic portion can receive an instruction to execute the interrupt processing. The arithmetic portion that has received the instruction to execute the interrupt processing stops the main processing and executes the interrupt processing. For example, the arithmetic portion that has received an event associated with the instruction executes the interrupt processing and stores the execution result in the memory portion. Then, the arithmetic portion that has recovered from the interrupt processing can resume the main processing on the basis of the execution result of the interrupt processing.

In a seventh step, the folded state is specified by the data SENS on fold by the interrupt processing (see FIG. 2B (T7)).

In the case where the folded state is changed in an eighth step, the eighth step proceeds to a ninth step, whereas in the case where the folded state is not changed, the eighth step proceeds to a tenth step (see FIG. 2B (T8)).

Note that the change of the folded state can be judged by comparing the folded state with that specified in the first step.

In the ninth step, the application is terminated (see FIG. 2B (T9)).

In the tenth step, the arithmetic portion is recovered from the interrupt processing (see FIG. 2B (T10)).

The following describes individual components included in the data processing device 100 of one embodiment of the present invention.

<<Input/Output Unit>>

The input/output unit 120 is connected to the transmission path 114 through the input/output interface 115. The input/output unit 120 can supply external data to the data processing device 100. Moreover, internal data of the data processing device 100 can be supplied to the outside.

<<Sensor Portion and Sign>>

The sensor portion 123 senses at least the folded state of the display portion 122 and supplies the data SENS on fold.

The sensor portion 123 is provided with a sensor for sensing the sign 129 placed near the display portion 122. Accordingly, the sensor portion 123 can supply a fold signal in accordance with the folded state of the display portion 122.

For example, the shape or place of an object such as a protrusion, an electromagnetic wave such as light, an electric wave, or a magnetic force, or the like can serve as the sign 129. Specifically, the above serving as the sign 129 may have different polarities (e.g., the N- and S-poles of a magnet) or different signals (e.g., electromagnetic waves which are modulated by different methods), for example.

A sensor that can identify the sign 129 is selected as the sensor included in the sensor portion 123.

Specifically, in the case where a structure having different shapes or in different places (e.g., a protrusion) is used as the sign 129, a switch or the like having different shapes or in different places can be used for the sensor so that the structure can be identified. Alternatively, in the case where light is used as the sign 129, a photoelectric conversion element or the like can be used for the sensor. In the case where an electric wave is used as the sign 129, an antenna or the like can be used for the sensor. In the case where a magnetic force is used as the sign 129, a magnetic sensor or the like can be used for the sensor.

A method of specifying the folded state of the display portion 122 by a signal supplied from the sensor that senses the sign will be described in detail in Embodiment 2.

Note that the sensor portion 123 senses acceleration, a direction, a global positioning system (GPS) signal, temperature, humidity, or the like and may supply data thereon.

<<Input Means>>

As the input means 121, any of a variety of human interfaces and the like can be used. Specifically, a keyboard, a mouse, a touch sensor, a microphone, a camera, or the like can be used. In particular, supplying an operation instruction using a pointer is convenient because it enables intuitional operation.

For example, in the case where a touch panel is used as the input means 121 that is overlapped with and integrally formed with the display portion, a user of the data processing device 100 can input an operation instruction INPUT including a termination instruction or the like by gestures (e.g., tap, drag, swipe, and pinch-in) using a finger as a pointer on the touch panel.

<<Display Portion>>

The display portion 122 has flexibility and therefore can be bent.

A first plane (also referred to as a surface) of the display portion 122 which is provided in a planar manner is shown in FIG. 1B1. A second plane (also referred to as a rear surface) opposite to the first plane is shown in FIG. 1B2.

The folded state of the display portion 122 is shown in FIGS. 1C1 and 1C2.

Note that the structure of the display portion having flexibility that can be applied to this embodiment will be described in detail in Embodiments 4 and 5.

Note that although the display portion 122 foldable in three parts is provided in the data processing device 100 described in this embodiment, the foldable number in one embodiment of the present invention is not limited to three. Specifically, the display portion may be foldable in two parts or in four or more parts. As the foldable number gets larger, a highly browsable data processing device can be provided. Alternatively, a highly portable data processing device can be provided.

<<Communication Unit>>

The communication portion 125 connects an external network and the data processing device 100. The data processing device 100 obtains or supplies data COM from or to the outside. Specifically, a network connection device, a modem, or the like can be used as the communication portion 125.

<<Other Components>>

As the input/output unit 120, for example, a camera, a microphone, a read-only external memory portion, an external memory portion, a communication unit, a scanner, a speaker, or a printer can be used.

Specifically, as a camera, a digital camera, digital video camera, or the like can be used.

As an external memory portion, a hard disk, a removable memory, or the like can be used. As a read-only external memory portion, a CD-ROM, a DVD-ROM, or the like can be used.

This embodiment can be combined as appropriate with any of the other embodiments in this specification.

Embodiment 2

In this embodiment, a structure of a data processing device of one embodiment of the present invention will be described with reference to FIGS. 1A to 1C2 and FIGS. 3A1, 3A2, 3B1, 3B2, 3C1, 3C2, 3D1, 3D2, 3E1, 3E2, 3F1, and 3F2.

Specifically, the data processing device 100 including the foldable display portion 122, a foldable housing that supports the display portion 122, the sign 129 placed on the housing, and the sensor portion 123 that senses the sign 129 is described. A signal on fold, which is supplied by the sensor portion 123 depending on the folded state of the data processing device 100, is described.

FIGS. 3A1 to 3F2 are schematic views illustrating the folded states of the display portion 122 and the housing that support the display portion 122 of the data processing device 100 of one embodiment of the present invention. Specifically, the schematic views illustrate the unfolded state and 10 kinds of different folded states.

The data processing device 100 described in this embodiment includes a connection housing C provided with a first plane (also referred to a surface; see FIG. 1B1) and a second plane (also referred to as a rear surface; see FIG. 1B2) opposite to the first plane.

The data processing device 100 includes the sensor portion 123 that discerns a first sign 129(1) and a second sign 129(2) which can approach the first plane of the connection housing C and a third sign 129(3) and a fourth sign 129(4) which can approach the second plane thereof. Note that the sensor portion 123 includes a sensor 123L.

The data processing device 100 includes a first housing L connected to the connection housing C so as to be movable from the position at which the first plane of the first housing L faces the first plane of the connection housing C to the position at which the second plane of the first housing L opposite to the first plane thereof faces the second plane of the connection housing C (see FIG. 1C1).

The data processing device 100 further includes a second housing R connected to the connection housing C so as to be movable from the position at which the first plane of the second housing R faces the first plane of the connection housing C to the position at which the second plane of the second housing R opposite to the first plane thereof faces the second plane of the connection housing C (see FIG. 1C2).

The connection housing C, the first housing L, and the second housing R support the display portion 122 having flexibility so that the display portion 122 can be folded.

The first housing L is provided with the first sign 129(1) on the first plane and the third sign 129(3) on the second plane.

The second housing R is provided with the second sign 129(2) on the first plane and the fourth sign 129(4) on the second plane.

The data processing device 100 described in this embodiment includes the display portion 122 which can be folded and unfolded and the sensor portion 123 that can sense the folded and unfolded states of the display portion 122 and can supply the data on fold. Accordingly, a highly browsable data processing device can be provided. Alternatively, a highly portable data processing device can be provided.

In the data processing device 100 described in this embodiment, the second housing R is provided with a fifth sign 129(5) on the first plane and a sixth sign 129(6) on the second plane. The sensor portion 123 discerns the sixth sign 129(6) that approaches the first plane of the first housing L and the fifth sign 129(5) that approaches the second plane of the first housing L. Note that the sensor portion 123 includes a sensor 123U.

The data processing device 100 described in this embodiment can sense the folded and unfolded states of the display portion 122 and can supply the data SENS on fold. Specifically, the data processing device 100 can be unfolded or folded in 10 kinds of different ways and the sensor portion 123 can supply different data SENS on fold that corresponds to the states. Accordingly, respective programs for executing different processing can be allocated to 11 different kinds of states. As a result, a data processing device that can be used in such a manner that a folding manner is changed to easily select any of a variety of functions can be provided.

Two or more different folded states of the display portion 122 of the data processing device 100 are described with reference to FIGS. 3A1 to 3F2.

The sensor portion 123 is provided with the sensor 123L in the connection housing C and the sensor 123U in the first housing L. Note that the sensor 123L and the sensor 123U can discern the signs 129 that approach the first plane and the signs 129 that approach the second plane.

The sensor portion 123 generates and supplies data SENS on fold that can specify the folded state of the display portion 122 in accordance with a combination of signals supplied from the sensor 123L and the sensor 123U.

Note that in the case where a sign 129(x) approaches the first plane and a sign 129(y) approaches the second plane, the sensor 123L and the sensor 123U supply a signal (x, y). In the case where the sign 129 does not approach the first plane or the second plane, a signal (0, 0) is supplied. Note that this expression is for convenience, and the format of a signal is not limited thereto as long as the sign 129 that approaches the first plane or the second plane can be discerned.

<Unfolded State>

The unfolded state of the connection housing C, the first housing L, and the second housing R of the data processing device 100 is illustrated in FIGS. 3A1 and 3A2. Note that FIG. 3A1 is a schematic view seen from the first plane (also referred to as a surface) and FIG. 3A2 is a schematic view seen from the second plane (also referred to as a rear surface) opposite to the first plane.

Note that the signs 129(1) to 129(6), the display portion 122, the sensor 123L, and the sensor 123U are not illustrated in FIGS. 3B1 to 3F2 so that complicated drawings do not disturb the understanding of the invention. These drawings can be easily understood by those skilled in the art by being compared with FIGS. 3A1 and 3A2.

In the unfolded state of the connection housing C, the first housing L, and the second housing R of the data processing device 10), any of the signs is not sensed by the sensor 123U and the sensor 123L. Accordingly, the sensor 123U supplies a signal (0, 0) and the sensor 123L supplies a signal (0, 0).

<Double-Fold States>

In the case where the first housing L of the data processing device 100 is folded over the second plane, the sensor 123L senses the third sign 129(3) placed on the second plane of the first housing L and supplies a signal (0, 3) (see FIG. 3B1).

In the case where the first housing L of the data processing device 100 is folded over the first plane, the sensor 123L senses the first sign 129(1) placed on the first plane of the first housing L and supplies a signal (1, 0) (see FIG. 3B2).

In the case where the second housing R of the data processing device 100 is folded over the second plane, the sensor 123L senses the fourth sign 129(4) placed on the second plane of the second housing R and supplies a signal (0, 4) (see FIG. 3C1).

In the case where the second housing R of the data processing device 100 is folded over the first plane, the sensor 123L senses the second sign 129(2) placed on the first plane of the second housing R and supplies a signal (2, 0) (see FIG. 3C2).

Note that in the double-fold states, any of the signs is not sensed by the sensor 123U. Accordingly, the sensor 123U supplies a signal (0, 0).

<Tri-Folded States>

In the case where the first housing L of the data processing device 100 is folded over the second plane and the second housing R thereof is folded over the first plane, the sensor 123L senses the third sign 129(3) placed on the second plane of the first housing L and the second sign 129(2) placed on the first plane of the second housing R and supplies a signal (2, 3) (see FIG. 3D1).

Note that the connection housing C is provided between the sensor 123U placed on the first housing L and the fifth sign 129(5) placed on the first plane of the second housing R. Accordingly, the sensor 123U supplies a signal (0, 0).

In the case where the first housing L of the data processing device 100 is folded over the first plane and the second housing R thereof is folded over the second plane, the sensor 123L senses the first sign 129(1) placed on the first plane of the first housing L and the fourth sign 129(4) placed on the second plane of the second housing R and supplies a signal (1, 4) (see FIG. 3D2).

Note that the connection housing C is provided between the sensor 123U placed on the first housing L and the sixth sign 129(6) placed on the second plane of the second housing R. Accordingly, the sensor 123U supplies a signal (0, 0).

In the case where the first housing L of the data processing device 100 is folded over the second plane and the second housing R thereof is folded over the second plane so as to overlap with the first housing L, the sensor 123L senses the third sign 129(3) placed on the second plane of the first housing L and supplies a signal (0, 3) (see FIG. 3E1). The sensor 123U senses the sixth sign 129(6) placed on the second plane of the second housing R and supplies a signal (6, 0).

In the case where the second housing R of the data processing device 100 is folded over the second plane and the first housing L thereof is folded over the second plane so as to overlap with the second housing R, the sensor 123L senses the fourth sign 129(4) placed on the second plane of the second housing R and supplies a signal (0, 4) (see FIG. 3E2). The sensor 123U senses the fifth sign 129(5) placed on the first plane of the second housing R and supplies a signal (0, 5).

In the case where the first housing L of the data processing device 100 is folded over the first plane and the second housing R thereof is folded over the first plane so as to overlap with the first housing L, the sensor 123L senses the first sign 129(1) placed on the first plane of the first housing L and supplies a signal (1, 0) (see FIG. 3F1). The sensor 123U senses the fifth sign 129(5) placed on the first plane of the second housing R and supplies a signal (0, 5).

In the case where the second housing R of the data processing device 100 is folded over the first plane and the first housing L thereof is folded over the first plane so as to overlap with the second housing R, the sensor 123L senses the second sign 129(2) placed on the first plane of the second housing R and supplies a signal (2, 0) (see FIG. 3F2). The sensor 123U senses the sixth sign 129(6) placed on the second plane of the second housing R and supplies a signal (6, 0).

This embodiment can be combined as appropriate with any of the other embodiments in this specification.

Embodiment 3

In this embodiment, a structure of a data processing device 200 of one embodiment of the present invention will be described with reference to FIGS. 4A and 4B, FIGS. 5A to 5D, FIGS. 6A to 6D, and FIGS. 7A1, 7A2, 7B1, 7B2, 7C1, and 7C2.

Figure 4A:
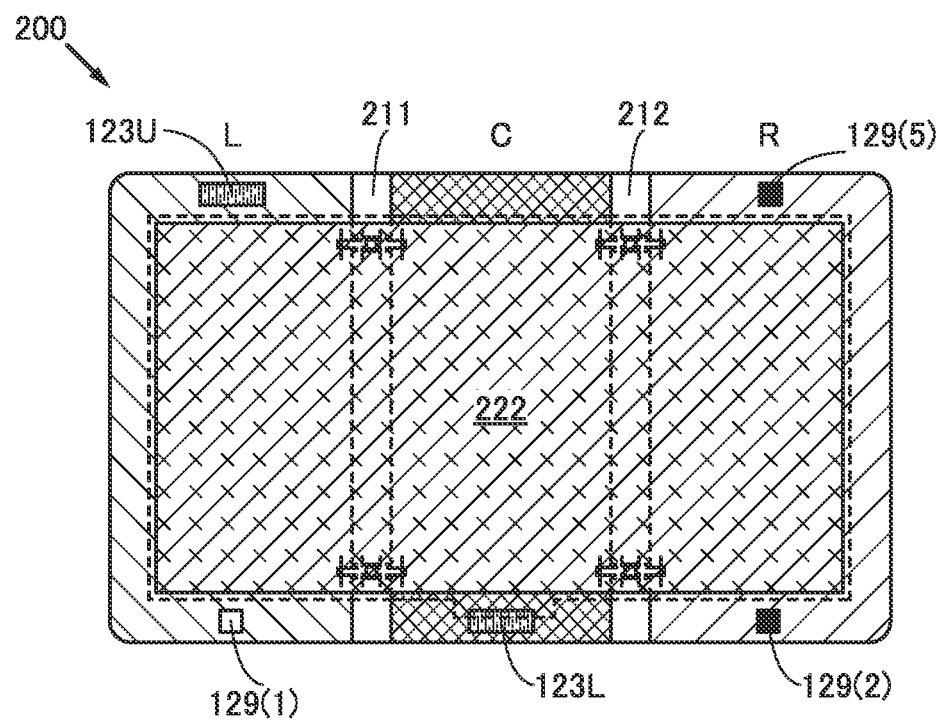
FIGS. 4A and 4B illustrate an unfolded data processing device of one embodiment.
Figure 4B:
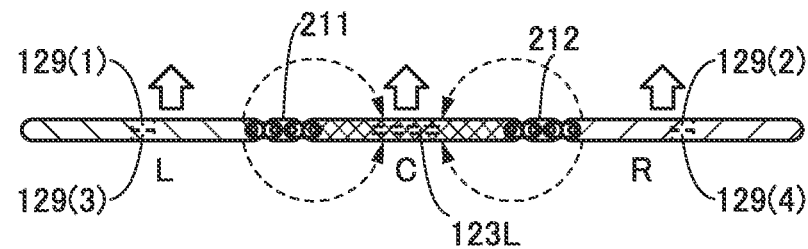

FIG. 4A is a top view illustrating a structure of the data processing device 200 of one embodiment of the present invention which is unfolded, and FIG. 4B is a side view thereof.

Figure 5A:
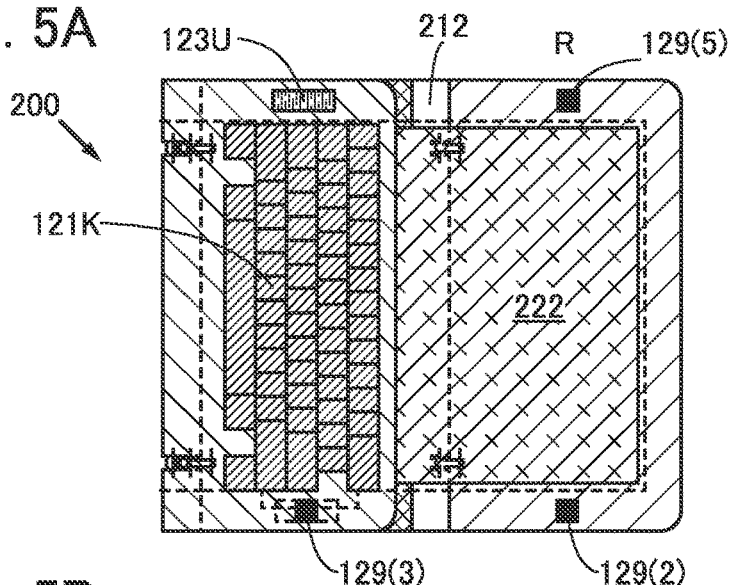
FIGS. 5A to 5D illustrate a double-fold data processing device of one embodiment.
Figure 5B:
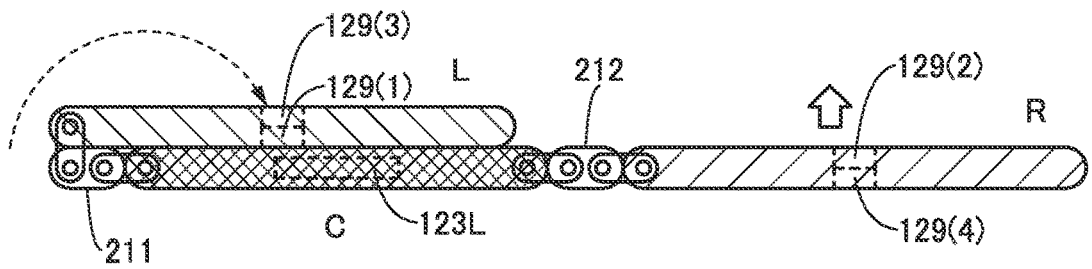
Figure 5C:
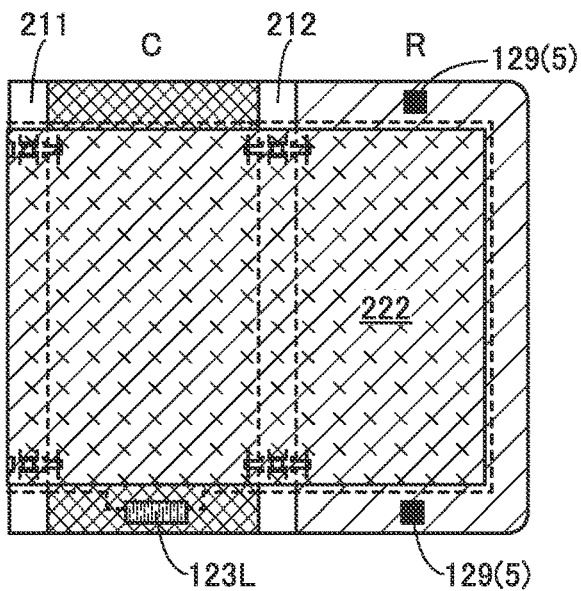
Figure 5D:
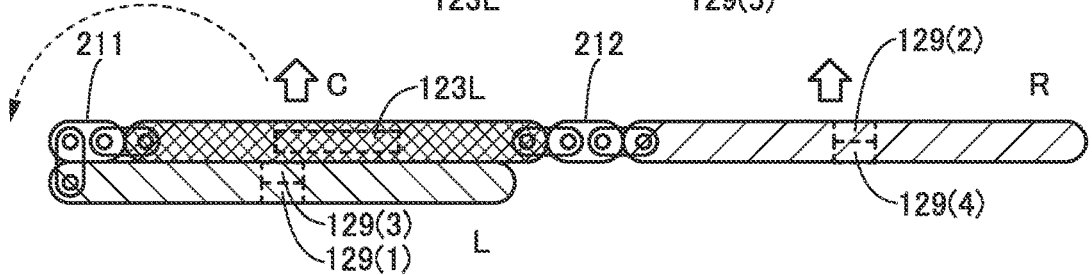

FIG. 5A is a top view illustrating a structure of the data processing device 200 of one embodiment of the present invention which is double-folded, and FIG. 5B is a side view thereof. FIG. 5C is a top view illustrating a structure of the data processing device 200 of one embodiment of the present invention which is double-folded in a manner different from that of the structure in FIG. 5A, and FIG. 5D is a side view thereof.

Figure 6A:
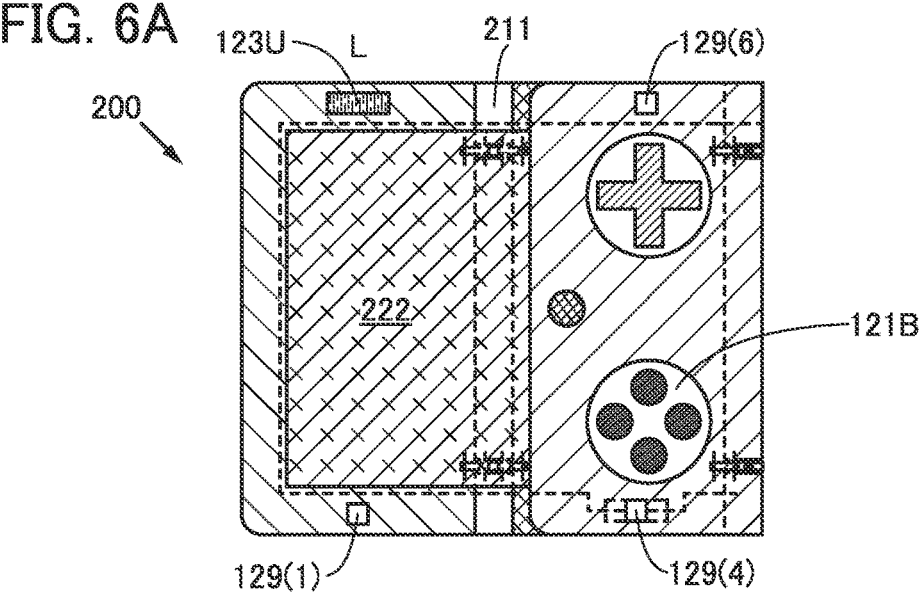
FIGS. 6A to 6D illustrate a double-fold data processing device of one embodiment.
Figure 6B:
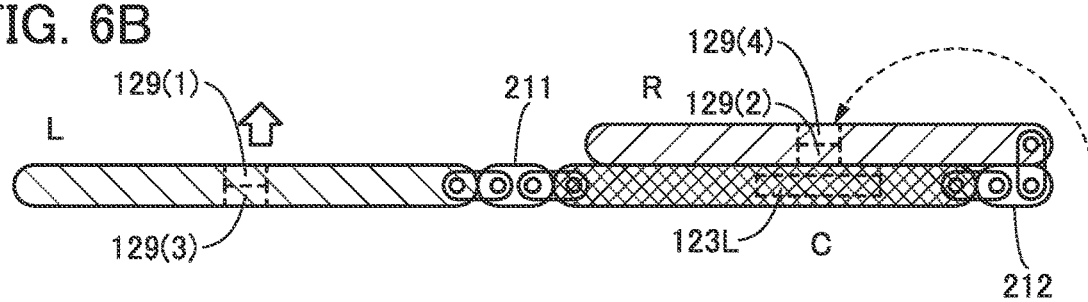
Figure 6C:
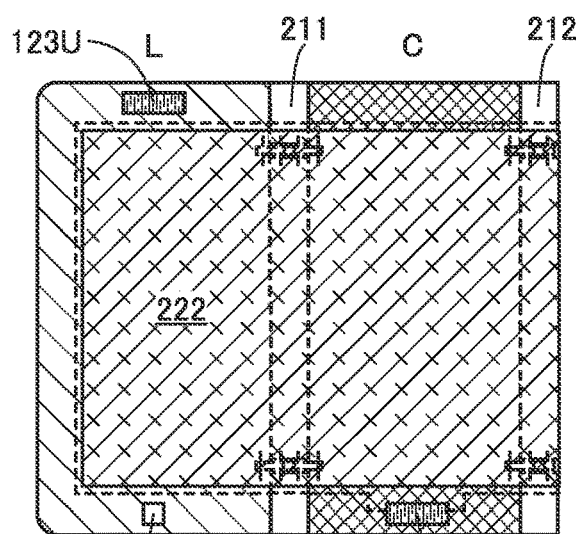
Figure 6D:
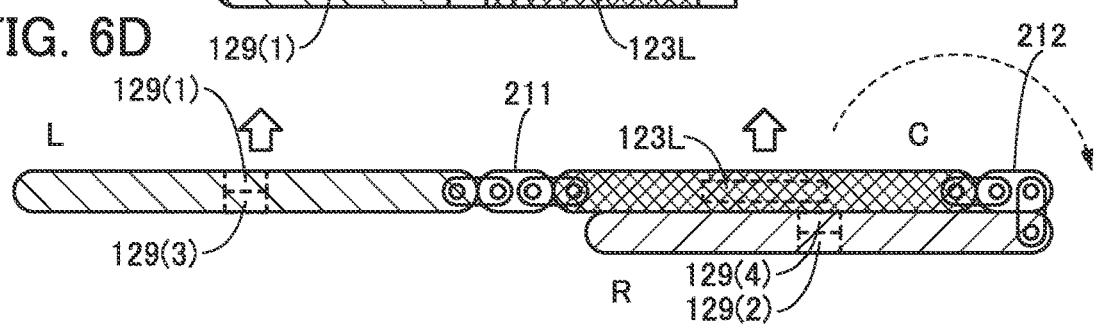

FIG. 6A is a top view illustrating a structure of the data processing device 200 of one embodiment of the present invention which is double-folded in a manner different from those of the structures in FIGS. 5A and 5C, and FIG. 6B is a side view thereof. FIG. 6C is a top view illustrating a structure of the data processing device 200 of one embodiment of the present invention which is double-folded in a manner different from that of the structure in FIG. 6A, and FIG. 6D is a side view thereof.

FIG. 7A1 is a top view illustrating a structure of the data processing device 200 of one embodiment of the present invention which is tri-folded, and FIG. 7A2 is a side view thereof.

FIG. 7B1 is a top view illustrating a structure of the data processing device 200 of one embodiment of the present invention which is tri-folded in a manner different from that of the structure in FIG. 7A1, and FIG. 7B2 is a side view thereof.

FIG. 7C1 is a top view illustrating a structure of the data processing device 200 of one embodiment of the present invention which is tri-folded in a manner different from that of the structure in FIGS. 7A 1 and 7B1, and FIG. 7C2 is a side view thereof.

The data processing device 200 described as an example in this embodiment includes the connection housing C. The connection housing C is provided with the sensor 123L that discerns the approach of a sign (see FIG. 4A).

The data processing device 200 includes the first housing L. The first housing L is connected to the connection housing C with a link 211 therebetween. Accordingly, the first housing L is movable from the position at which the first plane of the first housing L faces the first plane of the connection housing C to the position at which the second plane of the first housing L opposite to the first plane thereof faces the second plane of the connection housing C (see FIG. 4B). As a result, the data processing device 200 can be folded.

The first housing L is provided with the sensor 123U. The first housing L is provided with the first sign 129(1) on the first plane and the third sign 129(3) on the second plane.

The data processing device 200 includes the second housing R. The second housing R is connected to the connection housing C with a link 212 therebetween. Accordingly, the second housing R is movable from the position at which the first plane of the second housing R faces the first plane of the connection housing C to the position at which the second plane of the second housing R opposite to the first plane thereof faces the second plane of the connection housing C. As a result, the data processing device 200 can be folded.

The second housing R is provided with the second sign 129(2) and the fifth sign 129(5) on the first plane and the fourth sign 129(4) and the sixth sign 129(6) on the second plane.

The data processing device 200 is provided with a sensor portion including the sensor 123L and the sensor 123U.

The sensor 123L discerns the first sign 129(1) and the second sign 129(2) that approach the first plane of the connection housing C and the third sign 129(3) and the fourth sign 129(4) that approach the second plane thereof.

The sensor 123U discerns the sixth sign 129(6) that approaches the first plane of the first housing L and the fifth sign 129(5) that approaches the second plane thereof.

The connection housing C, the first housing L, and the second housing R of the data processing device 200 support the display portion 222 having flexibility. Note that the arrows in FIG. 4B indicate the direction in which the display portion 222 displays an image.

The data processing device 200 described in this embodiment includes the display portion 222 which can be folded and unfolded and the sensor portion 123 that can sense the folded and unfolded states of the display portion 222 and can supply data on fold. Accordingly, a highly browsable data processing device can be provided. Alternatively, a highly portable data processing device can be provided.

<Unfolded State>

In the unfolded state of the connection housing C, the first housing L, and the second housing R of the data processing device 200, any of the signs is not sensed by the sensor 123U and the sensor 123L. Accordingly, the sensor 123U supplies a signal (0, 0) and the sensor 123L supplies a signal (0, 0) (see FIG. 4A).

<Double-Fold States>

In the case where the first housing L of the data processing device 200 is folded over the first plane, the sensor 123L senses the first sign 129(1) placed on the first plane of the first housing L and supplies a signal (0, 1) (see FIGS. 5A and 5B).

As illustrated in FIGS. 5A and 5B, the data processing device 200 can be used by folding the first housing L over the first plane such that the second plane of the first housing L and the first plane of the second housing R face a user.

Note that an input means (e.g., a keyboard 121K) can be provided on the second plane of the first housing L (see FIG. 5A).

For example, a signal on fold supplied by the sensor portion in the case where the data processing device 200 is folded in this state can be correlated to an application for processing an e-mail. Accordingly, a user can deal with an e-mail by folding the data processing device 200 as illustrated in FIGS. 5A and 5B. Specifically, text data or the like can be input from the keyboard 121K with the use of the display portion 222 supported by the second housing R. In addition, display on the display portion 222 supported by the first housing L and the connection housing C can be stopped to reduce power consumption.

In the case where the first housing L of the data processing device 200 is folded over the second plane, the sensor 123L senses the third sign 129(3) placed on the second plane of the first housing L and supplies a signal (0, 3) (see FIGS. 5C and 5D).

As illustrated in FIGS. 5C and 5D, the data processing device 200 can be used by folding the first housing L over the second plane such that the first planes of the connection housing C and the second housing R face a user.

For example, a signal on fold supplied by the sensor portion in the case where the data processing device 200 is folded in this state can be correlated to an application for viewing an electronic book. Accordingly, a user can view an electronic book by folding the data processing device 200 as illustrated in FIGS. 5C and 5D.

In addition, display on the display portion 222 of the data processing device 200 which is folded in this state and supported by the first housing L can be stopped because the display portion 222 supported by the first housing L does not face a user. Accordingly, power consumption can be reduced.

In the case where a touch panel is provided so as to overlap with the display portion 222 which does not face a user, the touch panel may be used as an input means. Accordingly, the data processing device 200 can be supported or operated by a thumb on the user's side and a finger which does not face the user.

In the case where the second housing R of the data processing device 200 is folded over the first plane, the sensor 123L senses the second sign 129(2) placed on the first plane of the second housing R and supplies a signal (0, 2) (see FIGS. 6A and 6B).

Note that an input means (e.g., a control button 121B) can be provided on the second plane of the second housing R (see FIG. 6A).

For example, the signal on fold supplied by the sensor portion in the case where the data processing device 200 is folded in this state can be correlated to an application of a game. Accordingly, a user can enjoy the game by folding the data processing device 200 as illustrated in FIGS. 6A and 6B. Specifically, a character and the like can be handled by data input from the control button 121B with the use of the display portion 222 supported by the first housing L. In addition, display on the display portion 222 supported by the second housing R and the connection housing C can be stopped to reduce power consumption.

In the case where the second housing R of the data processing device 200 is folded over the first plane, the sensor 123R senses the fourth sign 129(4) placed on the second plane of the second housing R and supplies a signal (0, 4) (see FIGS. 6C and 6D).

For example, the signal on fold supplied by the sensor portion in the case where the data processing device 200 is folded in this state can be correlated to an application for viewing websites on the Internet. Accordingly, a user can view a website by folding the data processing device 200 as illustrated in FIGS. 6C and 6D.

Note that the application allocated to the data processing device 200 folded as illustrated in FIGS. 5A to 5D and the application allocated to the data processing device 200 folded as illustrated in FIGS. 6A to 6D may be able to be selected by a user. For example, the application to be allocated may be changed depending on whether user is right-handed or left-handed.

<Tri-Folded States>

In the case where the first housing L of the data processing device 200 is folded over the second plane and the second housing R thereof is folded over the second plane so as to overlap with the first housing L, the sensor 123L senses the third sign 129(3) placed on the second plane of the first housing L and supplies a signal (0, 3) (see FIGS. 7A1 and 7A2). The sensor 123U which is not illustrated senses the sixth sign 129(6) placed on the second plane of the second housing R and supplies a signal (6, 0).

In the case where the first housing L of the data processing device 200 is folded over the second plane and the second housing R thereof is folded over the first plane, the sensor 123L senses the third sign 129(3) placed on the second plane of the first housing L and the second sign 129(2) placed on the first plane of the second housing R and supplies a signal (2, 3) (see FIGS. 7B1 and 7B2). Although not illustrated, the connection housing C is provided between the sensor 123U placed on the first housing L and the fifth sign 129(5) placed on the first plane of the second housing R. Accordingly, the sensor 123U supplies a signal (0, 0).

Note that an input means (e.g., a camera 121C) can be provided on the second plane of the second housing R (see FIG. 7B1).

For example, the signal on fold supplied by the sensor portion in the case where the data processing device 200 is folded in this state can be correlated to an application for capturing an image. Accordingly, a user can capture an image by folding the data processing device 200 as illustrated in FIGS. 7B1 and 7B2. Specifically, an image can be captured from the camera 121C with the use of the display portion 222 supported by the first housing L. In addition, display on the display portion 222 supported by the second housing R and the connection housing C can be stopped to reduce power consumption.

In the case where the second housing R of the data processing device 200 is folded over the first plane and the first housing L thereof is folded over the first plane so as to overlap with the second housing R, the sensor 123L senses the second sign 129(2) placed on the first plane of the second housing R and supplies a signal (2, 0) (see FIGS. 7C1 and 7C2). The sensor 123U senses the sixth sign 129(6) placed on the second plane of the second housing R and supplies a signal (6, 0).

For example, the signal on fold supplied by the sensor portion in the case where the data processing device 200 is folded in this state can be correlated to an instruction to bring the data processing device into a standby state. Accordingly, display on the display portion 222 can be stopped to reduce power consumption by folding the data processing device 200 as illustrated in FIGS. 7C1 and 7C2.

This embodiment can be combined as appropriate with any of the other embodiments in this specification.

Embodiment 41

In this embodiment, a structure of an input/output unit that can be used for the data processing device of one embodiment of the present invention will be described with reference to FIGS. 8A to 8C.

Figure 8A:
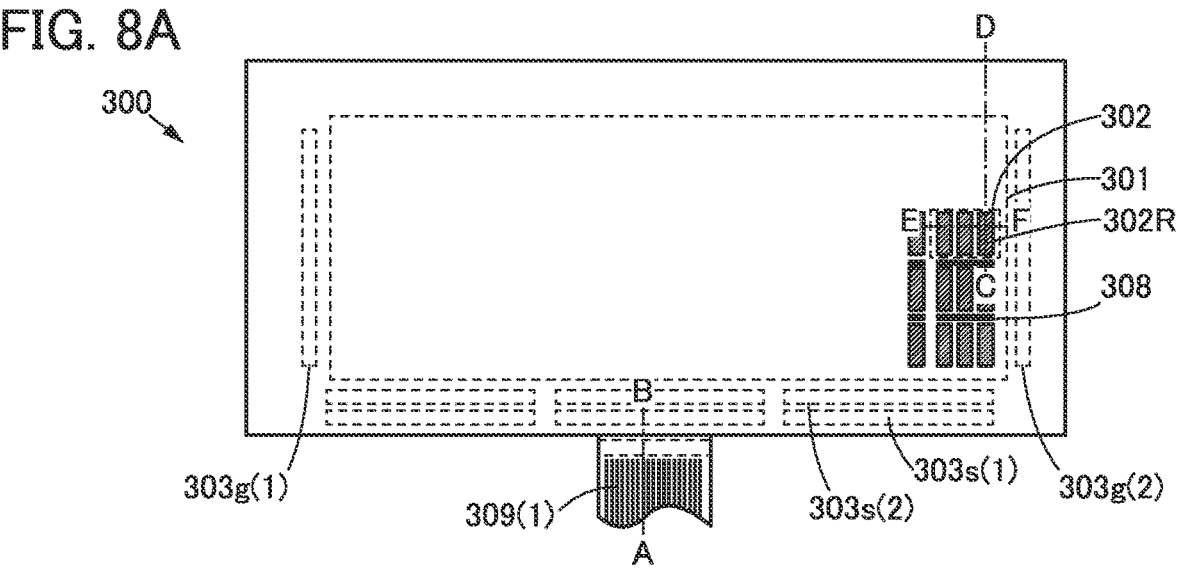
FIGS. 8A to 8C illustrate a structure of an input/output unit that can be applied to a data processing device of one embodiment.

FIG. 8A is a top view illustrating the structure of an input/output unit that can be used in the data processing device of one embodiment of the present invention.

Figure 8B:
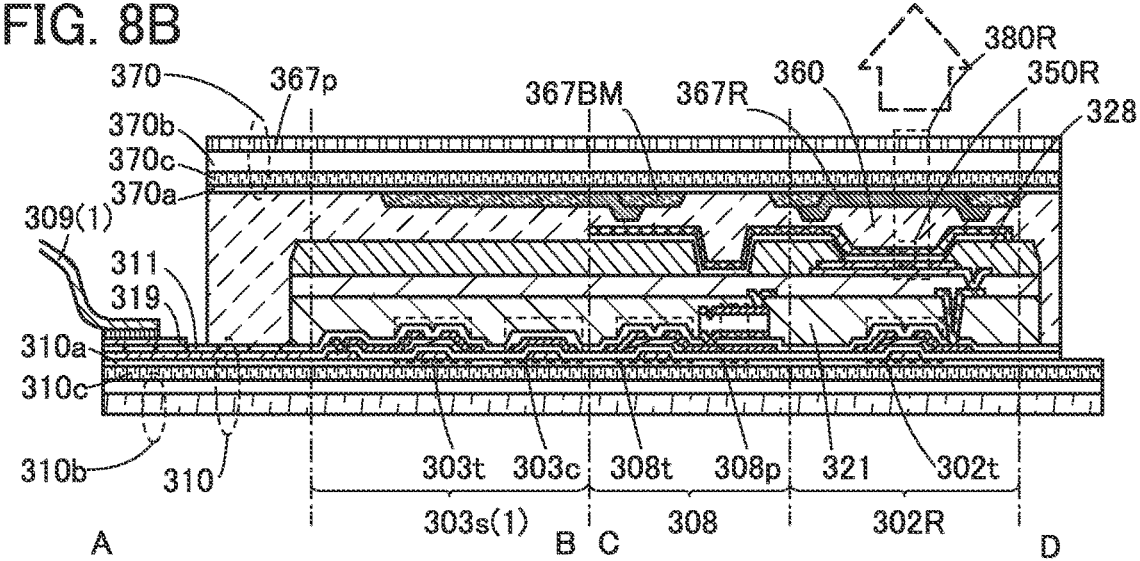

FIG. 8B is a cross-sectional view taken along line A-B and line C-D in FIG. 8A.

Figure 8C:
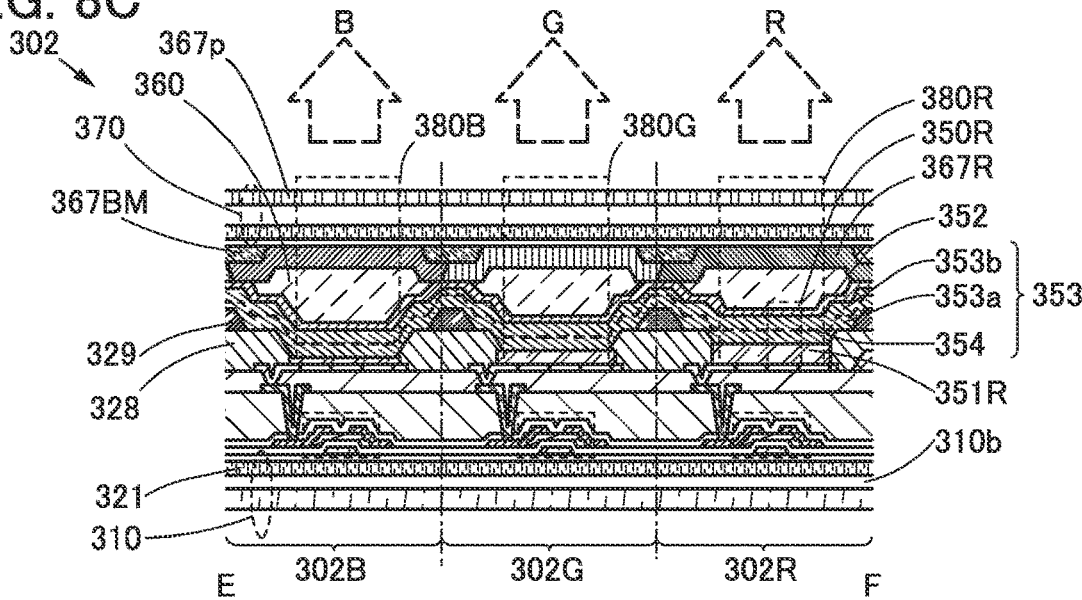

FIG. 8C is a cross-sectional view taken along line E-F in FIG. 8A.

<Top View>

An input/output unit 300 described as an example in this embodiment includes a display portion 301 (see FIG. 8A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals can be supplied and wirings through which image signals can be supplied.

Furthermore, the input/output unit 300 is provided with a scan line driver circuit 303g(1) that can supply selection signals to the pixels 302 and an image signal line driver circuit 303s(1) that can supply image signals to the pixels 302. Note that when the image signal line driver circuit 303s(1) is placed in a portion other than a bendable portion, malfunction can be inhibited.

The imaging pixels 308 include photoelectric conversion elements and imaging pixel circuits that drive the photoelectric conversion elements.

The imaging pixel circuits are electrically connected to wirings through which control signals can be supplied and wirings through which power supply potentials can be supplied.

Examples of the control signals include a signal for selecting an imaging pixel circuit from which a recorded imaging signal is read, a signal for initializing an imaging pixel circuit, and a signal for determining the time it takes for an imaging pixel circuit to sense light.

The input/output unit 300 is provided with an imaging pixel driver circuit 303g(2) that can supply control signals to the imaging pixels 308 and an imaging signal line driver circuit 303s(2) that reads out imaging signals. Note that when the imaging signal line driver circuit 303s(2) is placed in a portion other than a bendable portion, malfunction can be inhibited.

<Cross-Sectional View>

The input/output unit 300 includes a substrate 310 and a counter substrate 370 opposite to the substrate 310 (see FIG. 8B).

The substrate 310 is a stacked body in which a substrate 310b having flexibility, a barrier film 310a that prevents diffusion of unintentional impurities to the light-emitting elements, and an adhesive layer 310c that attaches the barrier film 310a to the substrate 310b are stacked.

The counter substrate 370 is a stacked body including a substrate 370b having flexibility, a barrier film 370a that prevents diffusion of unintentional impurities to the light-emitting elements, and an adhesive layer 370c that attaches the barrier film 370a to the substrate 370b (see FIG. 8B).

A sealant 360 attaches the counter substrate 370 to the substrate 310. The sealant 360 also serving as an optical adhesive layer has a refractive index higher than that of air. The pixel circuits and the light-emitting elements (e.g., a first light-emitting element 350R) and the imaging pixel circuits and photoelectric conversion elements (e.g., a photoelectric conversion element 308p) are provided between the substrate 310 and the counter substrate 370.

<<Structure of Pixel>>

Each of the pixels 302 includes a sub-pixel 302R a sub-pixel 302G, and a sub-pixel 302B (see FIG. 8C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 8B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 8C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 8B and 8C.

<<Structure of Input/Output Unit>>

The input/output unit 300 includes a light-blocking layer 367BM on the counter substrate 370. The light-blocking layer 367BM is provided so as to surround the coloring layer (e.g., the first coloring layer 367R).

The input/output unit 300 includes an anti-reflective layer 367p positioned in a region overlapping with the display portion 301. As the anti-reflective layer 367p, a circular polarizing plate can be used, for example.

The input/output unit 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output unit 300 includes the light-emitting elements (e.g., the first light-emitting element 350R) over the insulating film 321.

The input/output unit 300 includes, over the insulating film 321, a partition wall 328 that overlaps with an end portion of the first lower electrode 351R (see FIG. 8C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the image signal line driver circuit 303s(1) can be formed in the same process and over the same substrate as those of the pixel circuits.

<<Structure of Imaging Pixel>>

The imaging pixels 308 each include the photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Structures>>

The input/output unit 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319. The FPC 309(1) is preferably placed in a portion other than a bendable portion of the input/output unit 300. Moreover, the FPC 309(1) is preferably placed at almost the center of one side of a region surrounding the display portion 301, especially a side which is folded (a longer side in FIG. 8A). Accordingly, the distance between an external circuit for driving the input/output unit 300 and the input/output unit 300 can be made short, resulting in easy connection. Furthermore, the center of gravity of the external circuit can be made almost the same as that of the input/output unit 300. As a result, the data processing device can be treated easily and mistakes such as dropping can be prevented.

Note that a printed wiring board (PWB) may be attached to the FPC 309(1).

This embodiment can be combined as appropriate with any of the other embodiments in this specification.

Embodiment 5

In this embodiment, a structure of a foldable touch panel in which a touch sensor (a contact sensor device) as an input means is provided to overlap with a display portion is described with reference to FIGS. 9A and 9B and FIG. 10.

Figure 9A:
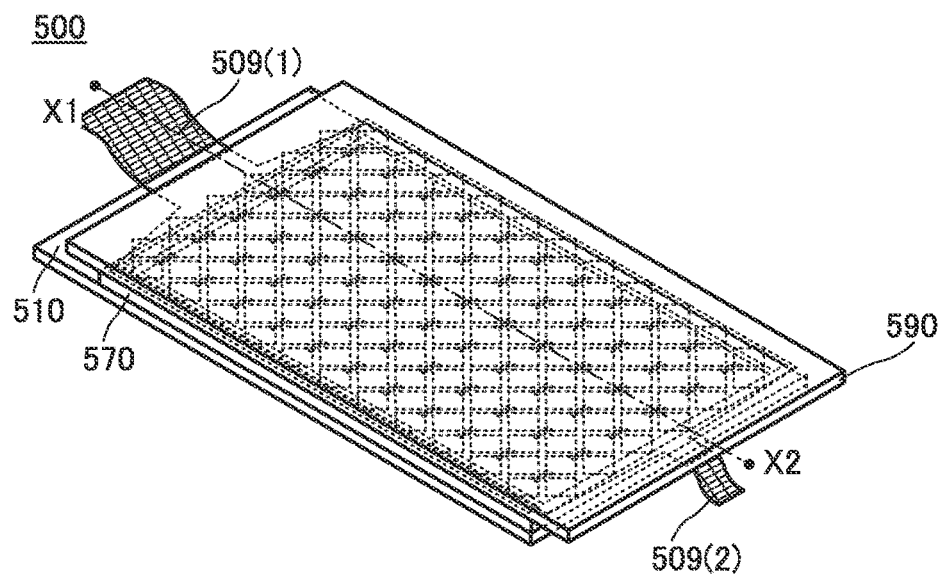
FIGS. 9A and 9B illustrate a structure of an input/output unit that can be applied to a data processing device of one embodiment.

FIG. 9A is a schematic perspective view of a touch panel 500 described as an example in this embodiment. Note that FIGS. 9A and 9B illustrate only main components for simplicity. FIG. 9B is a developed view of the schematic perspective view of the touch panel 500.

Figure 10:
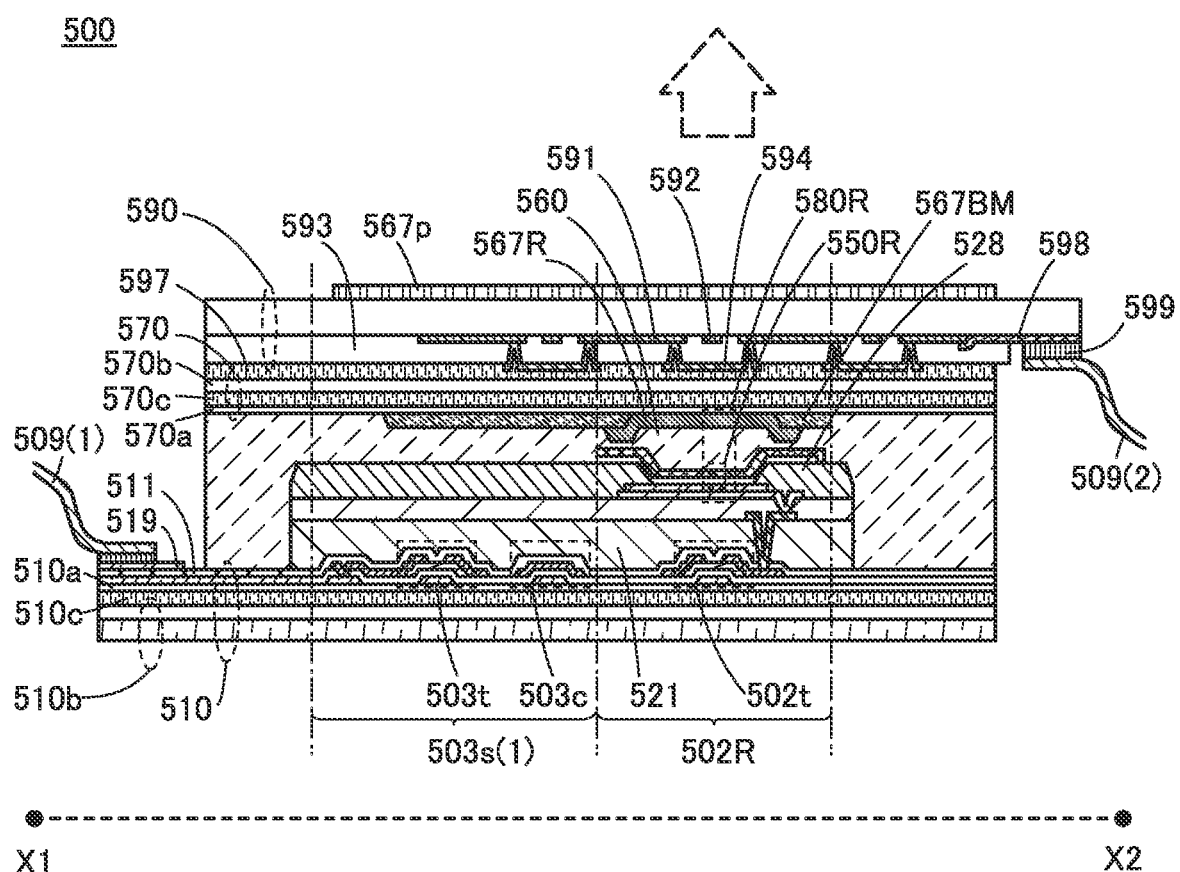
FIG. 10 illustrates a structure of an input/output unit that can be applied to a data processing device of one embodiment.

FIG. 10 is a cross-sectional view of the touch panel 500 taken along line X1-X2 in FIG. 9A.

Figure 9B:
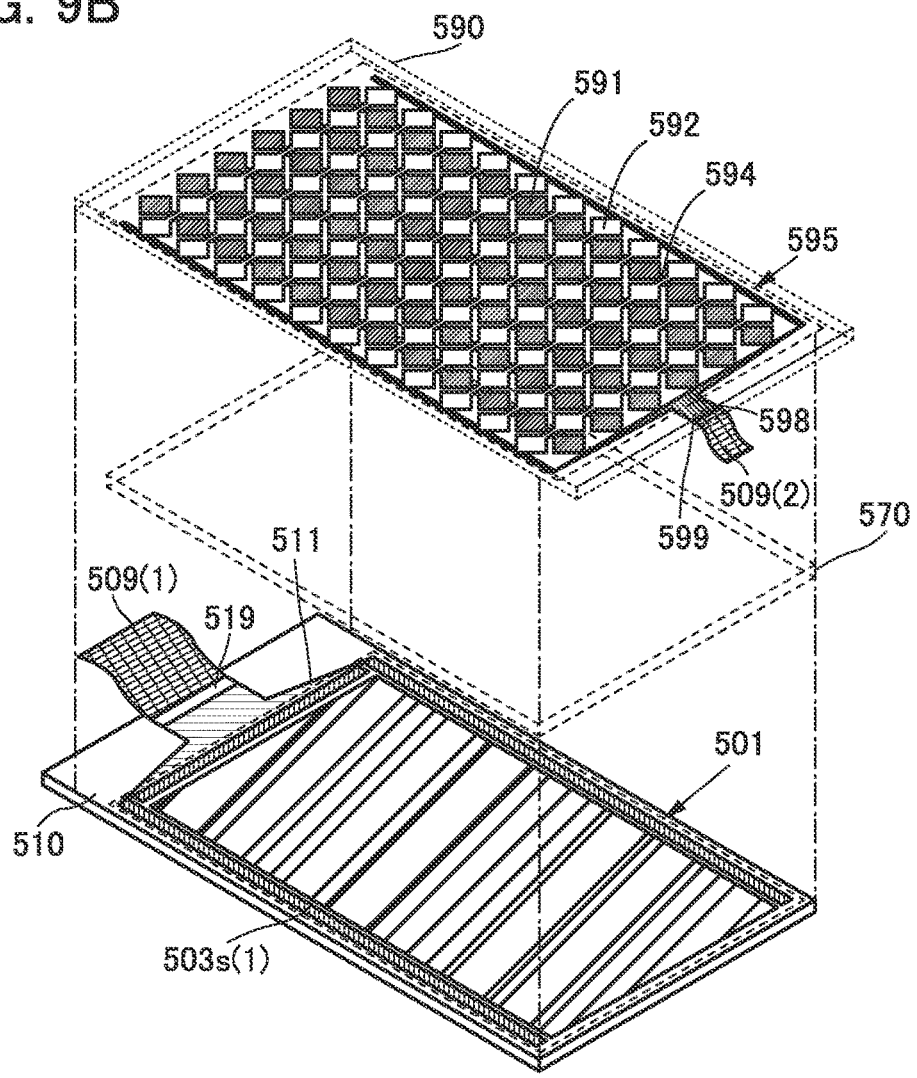

The touch panel 500 includes a display portion 501 and a touch sensor 595 (see FIG. 9B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 are led to a peripheral portion of the substrate 510, and part of the plurality of wirings 511 form a terminal 519. The terminal 519 is electrically connected to an FPC 509(1).
<Touch Sensor>

The substrate 590 includes the touch sensor 595 and a plurality of wirings 598 electrically connected to the touch sensor 595. The plurality of wirings 598 are led to the periphery of the substrate 590, and part of the wirings 598 form part of a terminal for electrical connection to an FPC 509(2). Note that in FIG. 9B, electrodes, wirings, and the like of the touch sensor 595 which are provided on the rear side of the substrate 590 (the rear side of the diagram) are indicated by solid lines for clarity.

As a touch sensor used as the touch sensor 595, a capacitive touch sensor is preferably used. Examples of the capacitive touch sensor are of a surface capacitive type, of a projected capacitive type, and the like. Furthermore, examples of the projected capacitive type are of a self capacitive type, a mutual capacitive type, and the like mainly in accordance with the difference in the driving method. The use of a mutual capacitive type is preferable because multiple points can be sensed simultaneously.

An example of using a projected capacitive touch sensor is described below with reference to FIG. 9B. Note that a variety of sensors that can sense the closeness or the contact of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrode 592 is in the form of a series of quadrangles arranged in one direction as illustrated in FIGS. 9A and 9B. Each of the electrodes 591 is in the form of a quadrangle. A wiring 594 electrically connects two electrodes 591 arranged in a direction intersecting with the direction in which the electrode 592 extends. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrode 591 and the electrode 592 are not limited thereto and can be any of a variety of shapes. For example, a structure may be employed in which the plurality of electrodes 591 are arranged so that gaps between the electrodes 591 are reduced as much as possible, and the electrode 592 is spaced apart from the electrodes 591 with an insulating layer interposed therebetween to have regions not overlapping with the electrodes 591. In this case, it is preferable to provide, between two adjacent electrodes 592, a dummy electrode electrically insulated from these electrodes because the area of regions having different transmittances can be reduced.

The structure of the touch panel 500 is described with reference to FIG. 10.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 may be formed by depositing a light-transmitting conductive material on the substrate 590 by a sputtering method and then removing an unnecessary portion by any of known patterning techniques such as photolithography.

The insulating layer 593 covers the electrodes 591 and the electrodes 592. Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than the electrodes 591 and the electrodes 592.

One electrode 592 extends in one direction, and a plurality of electrodes 592 are provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 are not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 functions as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

For the connection layer 599, a known anisotropic conductive film (ACF), a known anisotropic conductive paste (ACP), or the like can be used.

The adhesive layer 597 has a light-transmitting property. For example, a thermosetting resin or an ultraviolet curable resin can be used; specifically, a resin such as acrylic, urethane, epoxy resin, or a resin having a siloxane bond can be used.

<Display Portion>

The touch panel 500 includes a plurality of pixels arranged in a matrix. Each of the pixels includes a display element and a pixel circuit for driving the display element.

In this embodiment, an example of using a white organic electrolumnnescent element as a display element will be described; however, the display element is not limited to such an element.

As the display element, for example, other than organic electroluminescent elements, any of a variety of display elements such as display elements (electronic ink) that perform display by an electrophoretic method, an electronic liquid powder method, or the like; MEMS shutter display elements; and optical interference type MEMS display elements can be used. Note that a structure suitable for display elements to be used can be selected from known pixel circuit structures.

The substrate 510 is a stacked body in which a substrate 510b having flexibility, a barrier film 510a that prevents diffusion of unintentional impurities to the light-emitting elements, and an adhesive layer 510c that attaches the barrier film 510a to the substrate 510b are stacked.

The substrate 570 is a stacked body in which a substrate 570b having flexibility, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560 also serving as an optical adhesive layer has a refractive index higher than that of air. The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R, for example, includes the sealant 560 that is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the sealant 560 that also serves as an optical adhesive layer and through the first coloring layer 567R and is emitted to the outside of the light-emitting module 580R as indicated by arrows in FIG. 10.

<<Structure of Display Portion>>

The display portion 501 includes a light-blocking layer 567BM on the substrate 570. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition wall 528 that overlaps with an end portion of the first lower electrode. In addition, a spacer that controls the distance between the substrate 510 and the substrate 570 is provided on the partition wall 528.

<<Structure of Image Signal Line Driver Circuit>>

The image signal line driver circuit 503s(1) includes a transistor 503t and a capacitor 503c. Note that the image signal line driver circuit 503s(1) can be formed in the same process and over the same substrate as those of the pixel circuits.

<<Other Structures>>

The display portion 501 includes the wiring 511 through which a signal can be supplied. The wiring 511 is provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined as appropriate with any of the other embodiments in this specification.

REFERENCE NUMERALS

100: data processing device, 110: arithmetic unit, 111: arithmetic portion. 112: memory portion, 114: transmission path, 115: input/output interface, 120: input/output unit, 121: input means, 121B: control button, 121C: camera, 121K: keyboard, 122: display portion, 123: sensor portion, 123L: sensor, 123R: sensor, 123U: sensor, 125: communication portion, 129: sign, 200: data processing device, 211: link, 212: link, 222: display portion, 300: input/output unit, 301: display portion, 302: pixel, 302B: sub-pixel, 302G: sub-pixel, 302R: sub-pixel, 302$t$: transistor, 303$c$: capacitor, 303$g$(1): scan line driver circuit, 303$g$(2): imaging pixel driver circuit, 303$s$(1): image signal line driver circuit, 303$s$(2): imaging signal line driver circuit, 303$t$: transistor, 308: imaging pixel, 308$p$: photoelectric conversion element. 308$t$: transistor, 309: FPC, 310: substrate, 310$a$: barrier film. 310$b$: substrate, 310$c$: adhesive layer, 311: wiring, 319: terminal, 321: insulating film, 328: partition wall, 329: spacer, 350R: light-emitting element, 351R: lower electrode, 352: upper electrode, 353: layer, 353$a$: light-emitting unit, 353$b$: light-emitting unit. 354: intermediate layer, 360: sealant. 367BM: light-blocking layer, 367$p$: anti-reflective layer, 367R: coloring layer, 370: counter substrate, 370$a$: barrier film, 370$b$: substrate, 370$c$: adhesive layer, 380B: light-emitting module, 380G: light-emitting module. 380R: light-emitting module, 500: touch panel, 501: display portion, 502R: sub-pixel, 502$t$: transistor, 503$c$: capacitor, 503$s$: image signal line driver circuit, 503$t$: transistor, 509: FPC, 510: substrate, 510$a$: barrier film, 510$b$: substrate, 510$c$: adhesive layer, 511: wiring, 519: terminal, 521: insulating film, 528: partition wall, 550R: light-emitting element, 560: sealant, 567BM: light-blocking layer, 567$p$: anti-reflective layer, 567R: coloring layer, 570: substrate, 570$a$: barrier film, 570$b$: substrate, 570$c$: adhesive layer, 580R: light-emitting module, 590: substrate, 591: electrode, 592: electrode, 593: insulating layer, 594: wiring, 595: touch sensor. 597: adhesive layer, 598: wiring, 599: connection layer, C: connection housing, L: first housing, R: second housing.

This application is based on Japanese Patent Application serial no. 2013-138895 filed with Japan Patent Office on Jul. 2, 2013, the entire contents of which are hereby incorporated by reference.

The invention claimed is:

1. A foldable device comprising:
a first housing, a second housing, and a link between the first housing and the second housing; and
a flexible display panel including a display portion continuously provided over a top surface of the first housing, a top surface of the link, and a top surface of the second housing,
wherein when the foldable device is folded such that the top surface of the first housing faces the top surface of the second housing, part of the display portion which does not face a user of the foldable device is configured to stop display,
wherein the display portion comprises:
a first substrate having flexibility;
a first adhesive layer over the first substrate;
a transistor over the first adhesive layer;
an insulating layer over the transistor;
a lower electrode of a light-emitting element over the insulating layer;
a partition having a region overlapping with a first part of the lower electrode;
a layer containing a light-emitting organic compound, the layer overlapping with a second part of the lower electrode;
an upper electrode of the light-emitting element over the layer;
a photodiode below the light-emitting element;
a coloring layer over the upper electrode;
a second adhesive layer over the coloring layer; and
a second substrate having flexibility, and
wherein the photodiode is not overlapped with the light-emitting element and the coloring layer.

2. The foldable device according to claim 1, wherein the foldable device is configured to be folded such that a back surface of the first housing faces a back surface of the second housing.

3. The foldable device according to claim 1, wherein one of a source and a drain of the transistor is electrically connected to the lower electrode through a conductive layer.

4. The foldable device according to claim 1, wherein the light-emitting element is configured to emit light to an outside of the flexible display panel through the coloring layer and the second substrate.

5. A foldable device comprising:
a first housing, a second housing, and a link between the first housing and the second housing; and
a flexible display panel including a display portion continuously provided over a top surface of the first housing, a top surface of the link, and a top surface of the second housing,
wherein when the foldable device is folded such that the top surface of the first housing faces the top surface of the second housing, part of the display portion which does not face a user of the foldable device is configured to stop display,
wherein the display portion comprises:
a first substrate having flexibility;
a first adhesive layer over the first substrate;
a transistor over the first adhesive layer;
an insulating layer over the transistor;
a lower electrode of a light-emitting element over the insulating layer;
a partition having a region overlapping with a first part of the lower electrode;
a layer containing a light-emitting organic compound, the layer overlapping with a second part of the lower electrode;
an upper electrode of the light-emitting element over the layer;
a photodiode below the light-emitting element, the photodiode not overlapping with a channel formation region of the transistor;
a coloring layer over the upper electrode;
a second adhesive layer over the coloring layer; and
a second substrate having flexibility, and
wherein the photodiode is not overlapped with the light-emitting element and the coloring layer.

6. The foldable device according to claim 5, wherein the foldable device is configured to be folded such that a back surface of the first housing faces a back surface of the second housing.

7. The foldable device according to claim 5, wherein one of a source and a drain of the transistor is electrically connected to the lower electrode through a conductive layer.

8. The foldable device according to claim 5, wherein the light-emitting element is configured to emit light to an outside of the flexible display panel through the coloring layer and the second substrate.

\* \* \* \* \*